(12) United States Patent
Migita et al.

(10) Patent No.: US 7,590,208 B2
(45) Date of Patent: Sep. 15, 2009

(54) CIRCUIT AND METHOD FOR GENERATING A TIMING SIGNAL, AND SIGNAL TRANSMISSION SYSTEM PERFORMING FOR HIGH-SPEED SIGNAL TRANSMISSION AND RECEPTION BETWEEN LSIS

(75) Inventors: Koji Migita, Kawasaki (JP); Jun Takahashi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 294 days.

(21) Appl. No.: 11/543,076

(22) Filed: Oct. 5, 2006

(65) Prior Publication Data

US 2007/0025453 A1    Feb. 1, 2007

Related U.S. Application Data

(62) Division of application No. 10/132,245, filed on Apr. 26, 2002, now abandoned.

(30) Foreign Application Priority Data

Aug. 31, 2001 (JP) .............................. 2001-264770
Jan. 28, 2002 (JP) .............................. 2002-19129

(51) Int. Cl.
    *H04L 7/00*    (2006.01)
(52) U.S. Cl. ..................................... 375/354
(58) Field of Classification Search ................. 375/354, 375/373; 327/295, 297
    See application file for complete search history.

(56) References Cited

U.S. PATENT DOCUMENTS 5,920,600 A * 7/1999 Yamaoka et al. ............ 375/376
6,433,598 B1  8/2002 Schultz
6,614,863 B1  9/2003 Baba

FOREIGN PATENT DOCUMENTS

| JP | 05-130094 A | 5/1993 |
| JP | 11-177540 A | 7/1999 |
| JP | 11-275066 A | 10/1999 |
| JP | 2000-174740 A | 6/2000 |

* cited by examiner

*Primary Examiner*—Kevin Y Kim
(74) *Attorney, Agent, or Firm*—Arent Fox LLP

(57) ABSTRACT

A signal transmission system has a plurality of signal lines, a plurality of transmitting circuits, a plurality of receiving circuits, and a timing adjusting circuit. The transmitting circuits are provided for the signal lines. Each of the receiving circuits receives a signal from a corresponding one of the transmitting circuits via the signal lines. The timing adjusting circuit, which is provided at the same side as the transmitting circuits, adjusts signal latch timing for the receiving circuits to optimum timing in accordance with signal skew caused between the signal lines. Therefore, a large-capacity and error free transmission can be performed at high speed using a plurality of signal lines without being affected by skew on each of the signal lines.

33 Claims, 35 Drawing Sheets

Fig.7

| code | RECEIVED DATA |
|------|---------------|
| 7    | 1             |
| 6    | 1             |
| 5    | 1             |
| 4    | 1             |
| 3    | 1             |
| 2    | 1             |
| 1    | 1             |
| 0    | 0             |
| -1   | 0             |
| -2   | 0             |
| -3   | 0             |
| -4   | 0             |
| -5   | 0             |
| -6   | 0             |
| -7   | 1             |
| -8   | 1             |

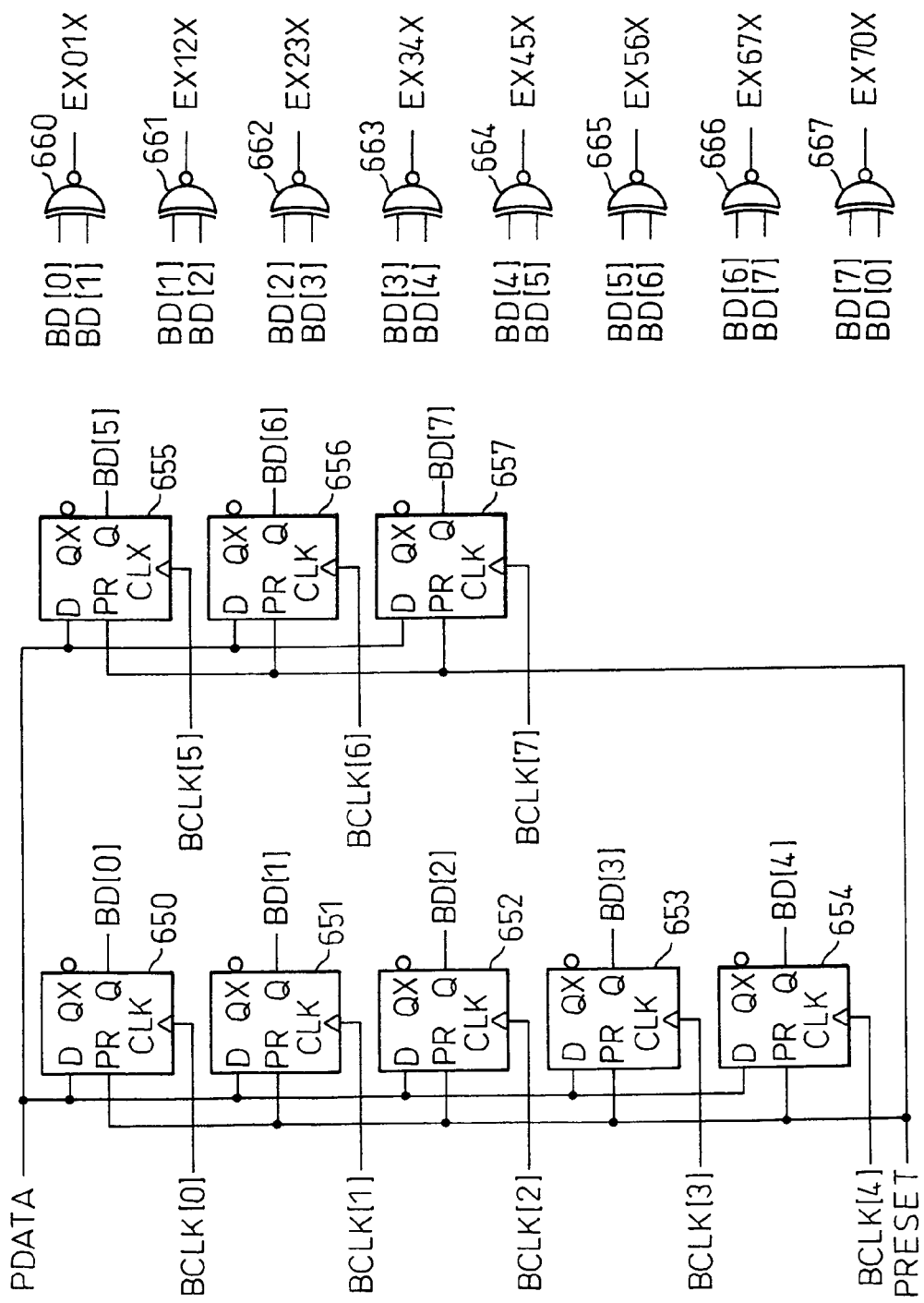

Fig.32

| | SELECTION LOGIC | OUTPUT SIGNAL |
|---|---|---|
| DCLK | EX01-F=H | BCLK[6] |
| | EX12-F=H | BCLK[7] |
| | EX23-F=H | BCLK[0] |
| | EX34-F=H | BCLK[1] |
| | EX45-F=H | BCLK[2] |
| | EX56-F=H | BCLK[3] |
| | EX67-F=H | BCLK[4] |
| | EX70-F=H | BCLK[5] |
| RESETX | EX01-F=H | RST01X |
| | EX12-F=H | RST12X |
| | EX23-F=H | RST23X |
| | EX34-F=H | RST34X |
| | EX45-F=H | RST45X |
| | EX56-F=H | RST56X |
| | EX67-F=H | RST67X |
| | EX70-F=H | RST70X |

Fig.34

| | TEST CLOCK | RECEIVE CLOCK (CLK) |
|---|---|---|
| ACLK [3:0] | ACLK [0], ACLK [1] | ACLK [3] |
| | ACLK [1], ACLK [2] | ACLK [0] |
| | ACLK [2], ACLK [3] | ACLK [1] |
| | ACLK [3], ACLK [0] | ACLK [2] |
| CLK [7:0] | BCLK [0], BCLK [1] | BCLK [5] (4, 3) |
| | BCLK [1], BCLK [2] | BCLK [6] (5, 4) |
| | BCLK [2], BCLK [3] | BCLK [7] (6, 5) |
| | BCLK [3], BCLK [4] | BCLK [0] (7, 6) |
| | BCLK [4], BCLK [5] | BCLK [1] (0, 7) |
| | BCLK [5], BCLK [6] | BCLK [2] (1, 0) |
| | BCLK [6], BCLK [7] | BCLK [3] (2, 1) |
| | BCLK [7], BCLK [0] | BCLK [4] (3, 2) |

CIRCUIT AND METHOD FOR GENERATING A TIMING SIGNAL, AND SIGNAL TRANSMISSION SYSTEM PERFORMING FOR HIGH-SPEED SIGNAL TRANSMISSION AND RECEPTION BETWEEN LSIS

CROSS-REFERENCE TO RELATED APPLICATIONS

This is a Divisional Application, which claims the benefit of U.S. patent application Ser. No. 10/132,245, filed Apr. 26, 2002 now abandoned. The disclosure of the prior application is hereby incorporated herein its entirety by reference.

BACKGROUND OF THE INVENTION

1. Field of the Invention

The present invention relates to circuit and method for generating a timing signal and signal transmission system, and more particularly, to a signal transmission system that performs high-speed signal transmission and reception between LSIs (Large Scale Integration Circuits) or between apparatuses.

2. Description of the Related Art

Recently, the performance of components used in computers and other information processing apparatuses has been greatly improved. In particular, dramatic improvements have been made, for example, in the performance of processors and semiconductor memory devices such as SRAMs (Static Random Access Memories) and DRAMs (Dynamic Random Access Memories). The improvements in the performance of semiconductor memory devices, processors, and the like have come to the point where system performance cannot be improved further unless the speed of signal transmission between components or elements is increased.

Specifically, in recent years, with increasing operating speeds of LSIs, signal transmission systems that perform large-capacity signal transmission using a plurality of signal lines have come to be used widely for signal transmission between LSIs or between apparatuses constructed with a plurality of LSIs. However, in such signal transmission systems using a plurality of signal lines, as the transmission speed increases, the difference (skew) in signal propagation delay between the signal lines becomes a problem, making accurate signal transmission difficult. It is therefore desired to provide a signal transmission system that can perform large-capacity signal transmission accurately and at high speed by using a plurality of signal lines.

The prior art and the problems associated with the prior art will be described in detail later with reference to accompanying drawings.

SUMMARY OF THE INVENTION

An object of the present invention is to provide a signal transmission system that can perform error-free signal transmission at high speed without being affected by skew on each signal line.

According to the present invention, there is provided a signal transmission system comprising a plurality of signal lines; a plurality of transmitting circuits provided for the signal lines; a plurality of receiving circuits each receiving a signal from a corresponding one of the transmitting circuits via the signal lines; and a timing adjusting circuit, provided at the same side as the transmitting circuits, adjusting signal latch timing for the receiving circuits to optimum timing in accordance with signal skew caused between the signal lines.

The signal transmission system may further comprise a skew information detecting and transmitting circuit, detecting at the same side as the receiving circuits the signal skew caused between the signal lines, and transmitting information of the detected skew to the timing adjusting circuit. The skew information detecting and transmitting circuit may detect the signal skew caused between the signal lines by receiving at the receiving circuits skew detection signals output from the transmitting circuits, and may feed skew information detected from the skew detection signals back to the timing adjusting circuit.

The timing adjusting circuit may comprise a selecting circuit, based on the skew information, an optimum clock for each of the transmitting circuits from among a plurality of clocks generated in advance. The skew detection signals may be output when power is turned on to the system or at a predetermined timing, and the timing adjustment may be performed based on the skew detection signals.

The timing adjusting circuit may provide an effective variable delay to a clock that drives each of the transmitting circuits. The timing adjusting circuit may provide an effective variable delay to a clock that drives each of the transmitting circuits and also to data that the each transmitting circuit outputs. The timing adjusting circuit may comprise a phase interpolator generating, from a plurality of clocks having different delay amounts, a new clock having a phase intermediate therebetween.

The timing adjusting circuit may comprise an output timing adjusting circuit making output timing adjustable for each of the transmitting circuits for data that is input to the each transmitting circuit in synchronism with a clock common to the transmitting circuits. The timing adjusting circuit may further comprise a clock comparing and generating circuit comparing a phase of an internal reference clock for the transmitting circuits with a phase of the common clock, and generating, based on the result of the phase comparison, a clock that is used to drive the transmitting circuits.

The signal transmission system may further comprise a receiving circuit clock generating circuit defining signal latch timing common to the receiving circuits. The receiving circuit clock generating circuit may comprise a clock transmitting circuit provided at the same side as the transmitting circuits; a single clock signal line; and a clock receiving circuit receiving a clock signal from the clock transmitting circuit via the clock signal line, and applying the clock signal as a common clock to the receiving circuits.

According to the present invention, there is provided a timing signal generating circuit comprising a candidate timing signal generating circuit generating a plurality of candidate timing signals with different phases; and a receive timing signal control circuit selecting a receive timing signal to be used to receive data, from among the plurality of candidate timing signals in accordance with a prescribed condition, and holding the selected receive timing signal.

Further, according to the present invention, there is also provided a signal transmission system comprising a transmitting circuit transmitting data, a signal transmission line, and a receiving circuit receiving data transmitted from the transmitting circuit over the signal transmission line, wherein the receiving circuit comprises a timing signal generating circuit comprising a candidate timing signal generating circuit generating a plurality of candidate timing signals with different phases; and a receive timing signal control circuit selecting a receive timing signal to be used to receive data, from among the plurality of candidate timing signals in accordance with a prescribed condition, and holding the selected receive timing signal.

The receive timing signal control circuit may comprises a test timing signal comparing circuit comparing a test timing signal, predetermined for each of the candidate timing signals, with a reference timing signal; and a receive timing signal selection/holding circuit selecting and holding the receive timing signal in accordance with an output of the test timing signal comparing circuit. A plurality of the test timing signals may be set for each of the candidate timing signals, and the test timing signal comparing circuit may compare the plurality of test timing signals with the reference timing signal. The test timing signal comparing circuit may compare the plurality of test timing signals with the reference timing signal a plurality of times, and the receive timing signal selection/holding circuit may select and hold the receive timing signal in accordance with the results of the plurality of comparisons made by the test timing signal comparing circuit.

The reference timing signal may be supplied in parallel with the received data. The reference timing signal may be supplied by being included in a stream of the received data. The receive timing signal control circuit may further comprise a receive timing signal releasing circuit releasing the selected and held receive timing signal in accordance with the output of the test timing signal comparing circuit. When the receive timing signal is released by the receive timing signal releasing circuit, the receive timing signal selection/holding circuit may select and hold a new receive timing signal in accordance with the output of the test timing signal comparing circuit. The receive timing signal control circuit may further comprise a receive timing signal release notification circuit notifying a circuit external to the timing signal generating circuit of the releasing of the receive timing signal when the receive timing signal releasing circuit has released the selected and held receive timing signal. A comparison condition in the test timing signal comparing circuit causing the receive timing signal releasing circuit to release the selected and held receive timing signal may be relaxed compared with a comparison condition in the test timing signal comparing circuit causing the receive timing signal selection/holding circuit to select and hold the receive timing signal.

The receive timing signal control circuit may further comprise a receive timing signal control disabling circuit externally disabling the selection of the receive timing signal from among the plurality of candidate timing signals and the holding of the selected receive timing signal. The receive timing signal control circuit may further comprise a receive timing signal control re-executing circuit externally re-executing the selection of the receive timing signal from among the plurality of candidate timing signals and the holding of the selected receive timing signal.

According to the present invention, there is also provided a timing signal generating method comprising the steps of preparing a plurality of candidate timing signals with different phases; and selecting a receive timing signal to be used to receive data, from among the plurality of candidate timing signals in accordance with a prescribed condition, and holding the selected receive timing signal.

The step of selecting and holding of the receive timing signal may comprise the steps of comparing a test timing signal, predetermined for each of the candidate timing signals, with a reference timing signal; and selecting and holding the receive timing signal in accordance with the result of the comparison between the test timing signal for the each candidate timing signal and the reference timing signal. A plurality of the test timing signals may be set for each of the candidate timing signals, and the plurality of test timing signals may be compared with the reference timing signal. The plurality of test timing signals may be compared with the reference timing signal a plurality of times, and the receive timing signal may be selected and held in accordance with the results of the plurality of comparisons made between the plurality of test timing signals and the reference timing signal.

The reference timing signal may be supplied in parallel with the received data. The reference timing signal may be supplied by being included in a stream of the received data.

The selection and holding of the receive timing signal may further include releasing the selected and held receive timing signal in accordance with the result of the comparison between the test timing signal for the each candidate timing signal and the reference timing signal. When the receive timing signal is released, the test timing signal predetermined for each of the candidate timing signals may be compared with the reference timing signal to select and hold a new receive timing signal. When the selected and held receive timing signal is released, the releasing of the receive timing signal may be notified to an external circuit. A comparison condition for releasing the selected and held receive timing signal may be relaxed compared with a comparison condition for selecting and holding the receive timing signal.

The selection of the receive timing signal from among the plurality of candidate timing signals and the holding of the selected receive timing signal may be disabled from outside. The selection of the receive timing signal from among the plurality of candidate timing signals and the holding of the selected receive timing signal may be re-executed from outside.

BRIEF DESCRIPTION OF THE DRAWINGS

The present invention will be more clearly understood from the description of the preferred embodiments as set forth below with reference to the accompanying drawings, wherein:

FIG. 7 is a diagram (part 2) for explaining the operation of the phase shift detection circuit in the signal transmission system of FIG. 5;

FIGS. 31A, 31B, 31C, and 31D are circuit diagrams showing one example of a clock recovery circuit in the timing signal generating circuit of FIG. 30;

FIG. 32 is a diagram for explaining the operation of the clock recovery circuit in the timing signal generating circuit of FIG. 30;

FIG. 34 is a diagram for explaining the operation of the decision circuit in the timing signal generating circuit of FIG. 30.

DESCRIPTION OF THE PREFERRED EMBODIMENTS

Before proceeding to a detailed description of the preferred embodiments of the present invention, problems associated with a prior art signal transmission system will be described first.

Recently, the performance of MPUs (Micro Processing Units) and semiconductor memory devices such as DRAMs (Dynamic Random Access Memories) and SDRAMs (Synchronous DRAMs), or components used to construct computers and other information processing apparatuses, has improved greatly, and with the improvement in performance, it has become necessary to perform high-speed signal transmission and reception (signal transfers) between LSIs (LSI chips) or between circuit boards or apparatuses constructed with a plurality of LSIs.

Figure 1:
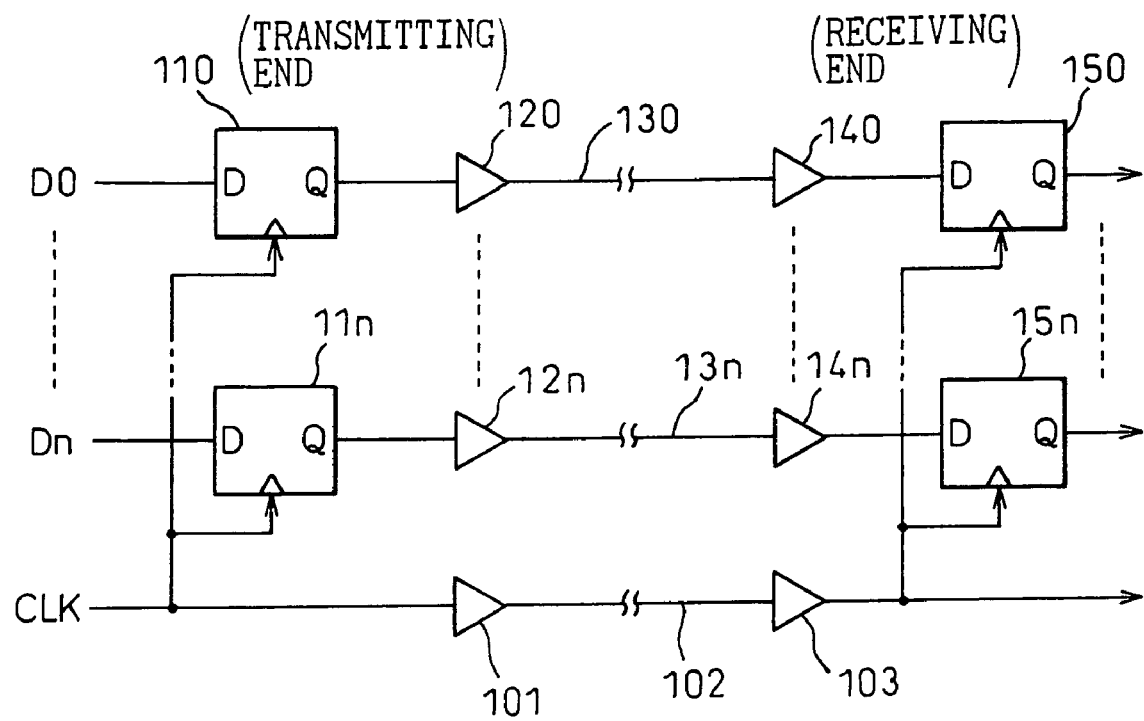
FIG. 1 is a block diagram schematically showing one example of a prior art signal transmission system.

FIG. 1 is a block diagram schematically showing one example of the prior art signal transmission system. In FIG. 1, reference numeral 101 is a drive circuit for a clock CLK at the transmitting end (transmitting buffer), 102 is a clock line (clock signal line), 103 is a drive circuit at the receiving end of the clock (receiving buffer), 110 to 11n are data latch circuits for data D0 to Dn at the transmitting end (transmitting latches), 120 to 12n are drive circuits for the data D0 to Dn at the transmitting end (transmitting buffers), 130 to 13n are data lines (data signal lines), 140 to 14n are drive circuits at the receiving end of the data (receiving buffers), and 150 to 15n are data latch circuits at the receiving end (receiving latches).

As shown in FIG. 1, in the prior art signal transmission system for handling large amounts of data, signals are transmitted using, for example, the plurality of signal lines 102 and 130 to 13n. That is, the data (signals) D1 to Dn are transmitted to the receiving buffers 140 to 14n via the respective transmitting latches 110 to 11n, transmitting buffers 120 to 12n, and data signal lines 130 to 13n, and are then supplied to the respective receiving latches 150 to 15n. On the other hand, the clock CLK is supplied, for example, to the clock terminals (latch timing control terminals) of the transmitting latches 110 to 11n and, at the same time, is transmitted to the receiving buffer 103 via the transmitting buffer 101 and clock signal line 102 and supplied to the clock terminals of the receiving latches 150 to 15n.

In this way, the prior art signal transmission system that uses a plurality of signal lines controls the latch timing by supplying the same clock CLK to both the transmitting latches 110 to 11n and the receiving latches 150 to 15n.

Figure 2:
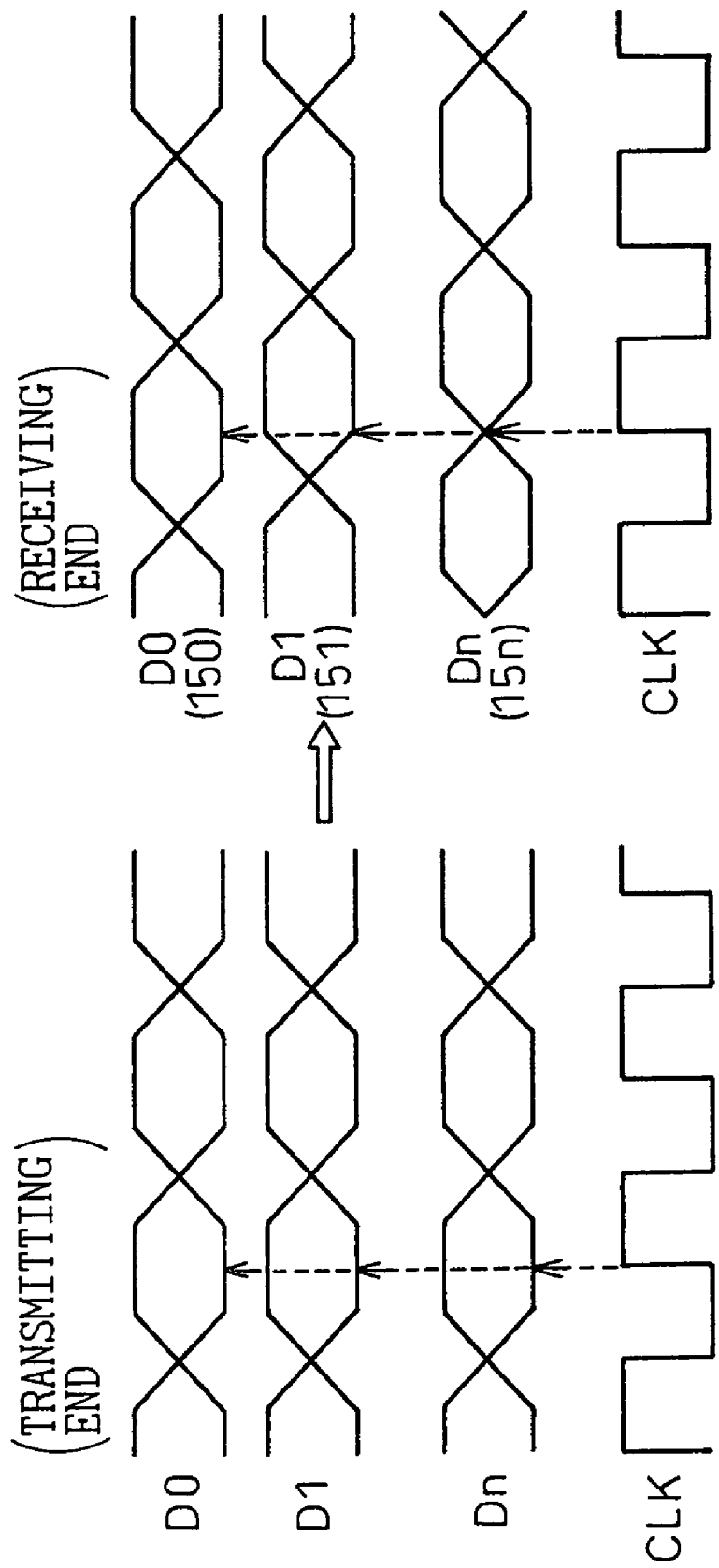
FIG. 2 is a timing diagram for explaining one example of operation in the signal transmission system of FIG. 1.

FIG. 2 is a timing diagram for explaining one example of operation in the signal transmission system of FIG. 1.

As shown in FIG. 2, for example, if data D0 to Dn are output with the same timing from the transmitting end, the data being transmitted experience slightly different delays through the respective signal lines 130 to 13n and arrive at the receiving end at slightly different times. That is, in the prior art signal transmission system shown in FIG. 1, since the clock CLK and the data D0 to Dn are transmitted along the clock signal line and the signal lines 130 to 13n by passing through the buffers 101 and 103 or through the respective buffers 120 to 12n and 140 to 14n on the way, the signals experience different delays through the respective signal lines; as a result, optimum signal (data) latch timing differs for each of the signal lines (data signal lines 130 to 13n). More specifically, as shown in FIG. 2, the data D0 and D1, for example, can be latched by the receiving latches 150 and 151, but if the data latch timing, for example, for latching the data Dn coincides with the transition period (boundary) of that data because of the amount of delay (skew) that differs for each signal line, it becomes difficult to accurately latch the data Dn by the receiving latch 15n.

For example, this skew problem becomes more pronounced as the frequency of the clock CLK and hence the operating speed (transmission speed) increases, and skew between the signal lines cannot be effectively dealt with as long as signals (data) are latched by supplying a common strobe signal (clock CLK) to the transmitting latches 110 to 11n and receiving latches 150 to 15n on both ends of the signal lines 421 to 42n.

More specifically, if the difference in optimum signal latch timing becomes excessively large between the receiving latches 150 to 15n on the respective signal lines, all the signals cannot be latched (received) correctly by using the common timing (clock CLK), and this imposes limits to the transmission distance and transmission speed with which signals can be correctly transmitted. If the signal transmission distance and transmission speed (bit rate) are to be increased, expensive cables specially tuned for reduced skew must be used, but this cannot provide a fundamental solution because, despite the increase in cost, substantial improvements in the transmission distance and transmission speed cannot be expected.

Next, the basic principle behind the signal transmission system of the present invention will be described with reference to FIGS. 3 and 4.

Figure 3:
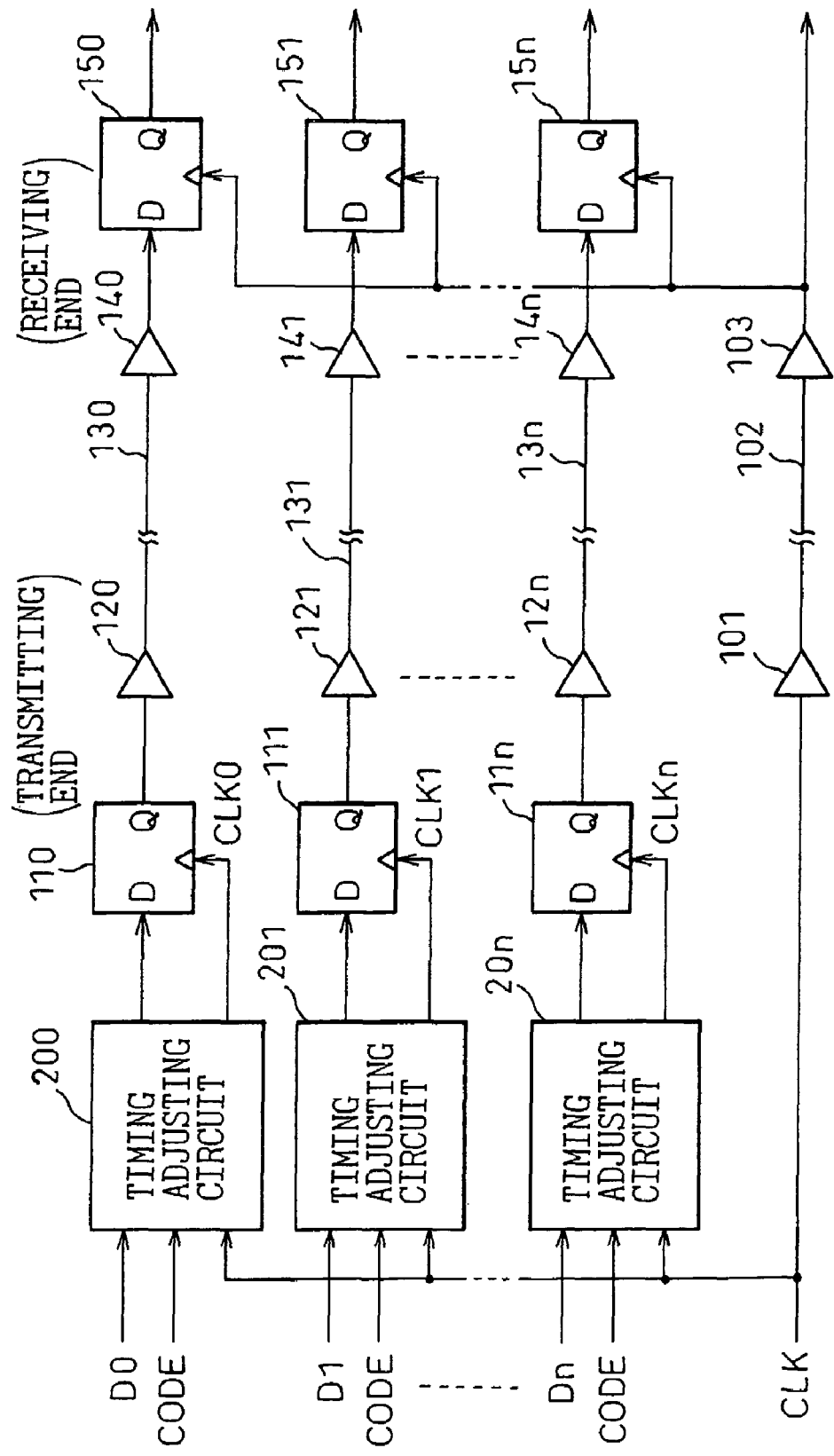
FIG. 3 is a block diagram schematically showing the basic functional configuration of a signal transmission system according to the present invention.

FIG. 3 is a block diagram schematically showing the basic functional configuration of the signal transmission system according to the present invention. In FIG. 3, reference numeral 101 is a drive circuit for a clock CLK at the transmitting end (transmitting buffer), 102 is a clock line (clock signal line), 103 is a drive circuit at the receiving end of the clock (receiving buffer), 110 to 11n are data latch circuits for data D0 to Dn at the transmitting end (transmitting latches), 120 to 12n are drive circuits for the data D0 to Dn at the transmitting end (transmitting buffers), 130 to 13n are data lines (data signal lines), 140 to 14n are drive circuits at the receiving end of the data (receiving buffers), 150 to 15n are data latch circuits at the receiving end (receiving latches), and 200 to 20n are timing adjusting circuits.

As is apparent from a comparison between FIG. 3 and FIG. 1, the signal transmission system of the present invention differs from the prior art signal transmission system shown in FIG. 1 by the inclusion of the timing adjusting circuits 200 to 20n, which are provided at the same side as the transmitting circuits (110 to 11n, 120 to 12n), and which adjust the signal latch timing for the respective receiving circuits to optimum timing according to the signal skew occurring between the respective signal lines.

More specifically, codes (timing adjusting codes) CODE0 to CODEn for adjusting the timing are input to the timing adjusting circuits 200 to 20n which, in accordance with the codes, apply clocks CLK0 to CLKn to the clock terminals (latch timing control terminals) of the respective transmitting latches 110 to 11n such that the signals can be latched in the respective receiving circuits (receiving latches 150 to 15n) with the optimum timing.

To achieve this, skew detection signals are output from the respective transmitting circuits when power is turned on to the system or at a predetermined timing (for example, at predetermined intervals of time or at the time that prescribed processing is performed), and the skew detection signals are received by the corresponding receiving circuits to detect signal skews between the respective signal lines; then, the signal skews detected from the skew detection signals on the respective signal lines are fed back as the timing adjusting codes CODE0 to CODEn to the respective timing adjusting circuits 200 to 20n.

Figure 4:
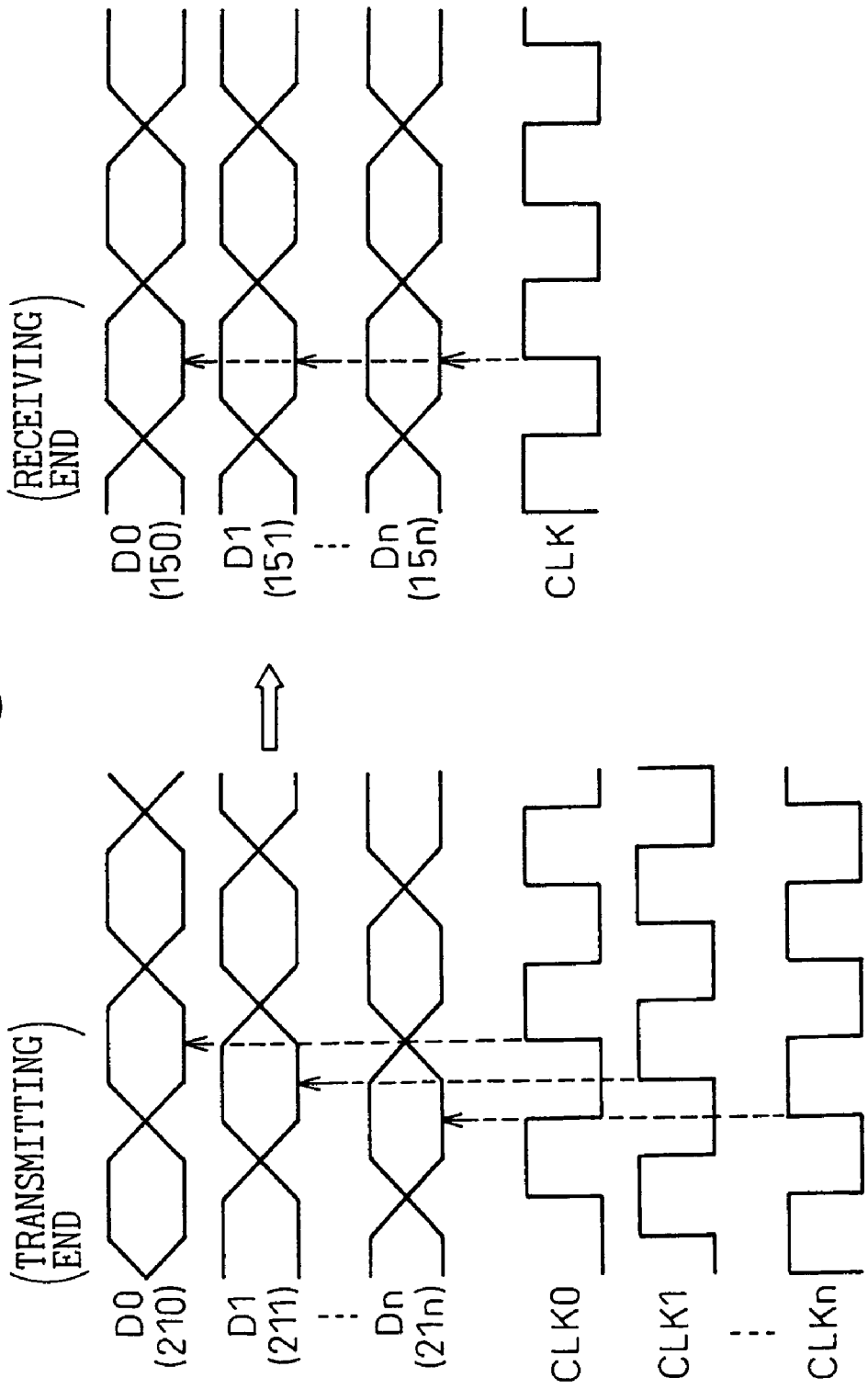
FIG. 4 is a timing diagram for explaining one example of operation in the signal transmission system of FIG. 3.

FIG. 4 is a timing diagram for explaining one example of operation in the signal transmission system of FIG. 3.

As shown in FIG. 4, the clocks CLK0 to CLKn supplied to the clock terminals of the respective transmitting latches 110 to 11n are the clocks that have been adjusted for timing by the timing adjusting circuits 200 to 20n at the transmitting end in accordance with the signal skews between the signal lines 130 to 13n. For example, the clocks CLK0, CLK1, and CLKn to be supplied to the clock terminals of the transmitting latches 110, 111, and 11n are adjusted for timing as shown in FIG. 4; that is, the rise timing of the clock CLK0 is delayed (the phase is delayed) because the skew due to the signal line 130, etc. is the smallest, and the rise timing of the clock CLKn is advanced most (the phase is advanced) because the skew due to the signal line 13n, etc. is the largest, while the rise timing of the clock CLK1 is chosen at an intermediate point between the above two clocks because the skew due to the signal line 131, etc. is about midway between the skew due to the signal line 130, etc. and the skew due to the signal line 13n, etc.

When the timings of the clocks CLK0 to CLKn to be supplied to the clock terminals of the respective transmitting latches 110 to 11n are adjusted at the transmitting end as described above, then even when the same clock is supplied to the receiving latches 150 to 15n at the receiving end, all the receiving latches 150 to 15n can latch (receive) the data with the optimum timing since the signal skews between the respective signal lines 130 to 13n are compensated for. That is, in the signal transmission system of the present invention, the timing adjusting circuits adjust the timings of the respective transmitting circuits by considering the skews between the respective signal lines at the time of transmission, thereby eliminating the skew between data so that the receiving circuits can latch the data with the same timing. In this way, high-speed, error-free signal transmission can be achieved without being affected by the skew on each signal line.

Embodiments of the signal transmission system of the present invention will be described in detail below with reference to accompanying drawings.

Figure 5:
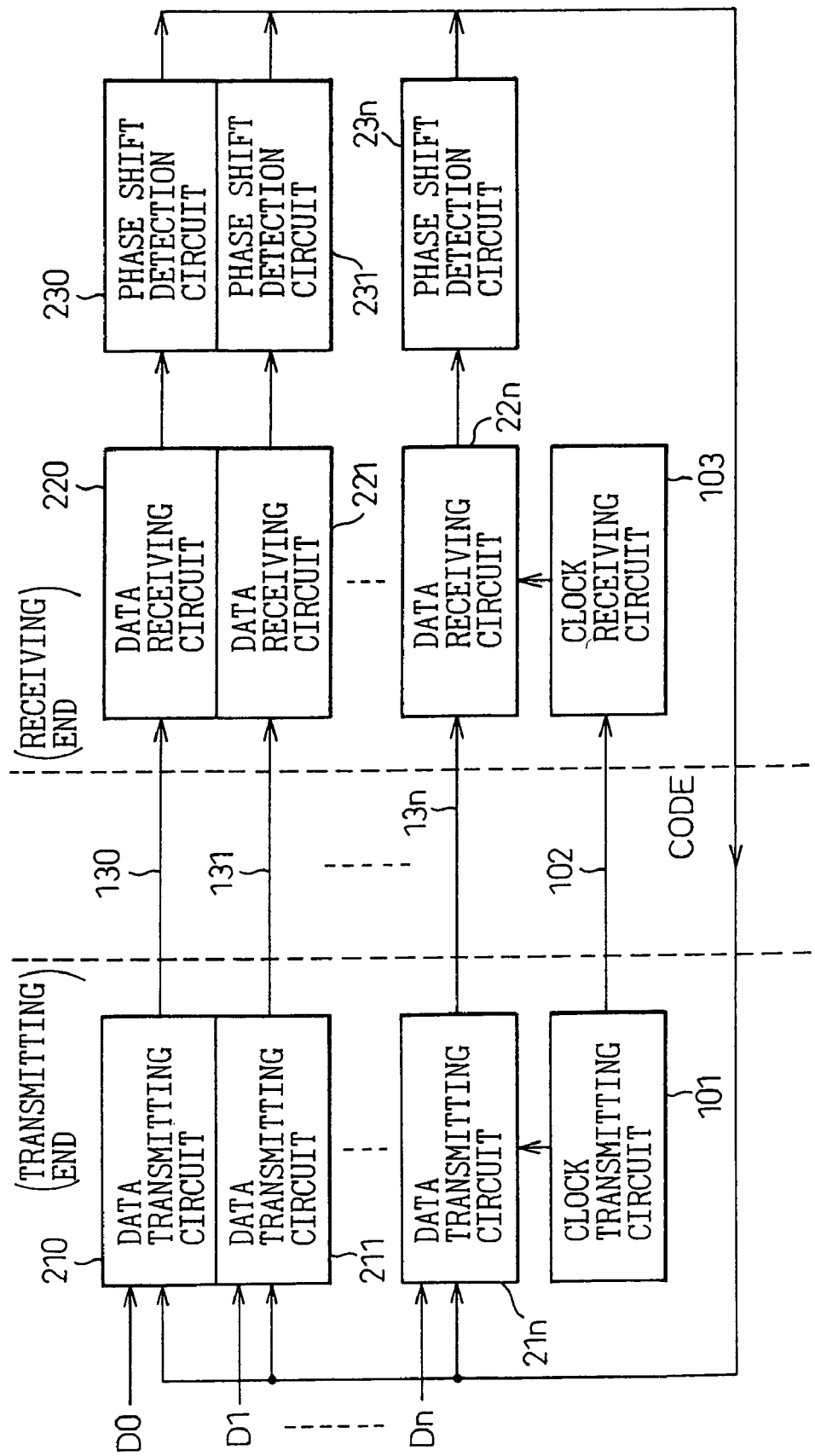
FIG. 5 is a block diagram showing one example of the signal transmission system according to the present invention.

FIG. 5 is a block diagram showing one example of the signal transmission system according to the present invention. In FIG. 5, reference numeral 101 is a clock buffer at the transmitting end, 102 is a clock signal line, 103 is a clock buffer at the receiving end, 210 to 21n are data transmitting circuits, 130 to 13n are data signal lines, 220 to 22n are data receiving circuits, and 230 to 23n are phase shift detection circuits. Here, the data transmitting circuits 210 to 21n comprise, for example, the timing adjusting circuits 200 to 20n, transmitting latches 110 to 11n, and transmitting buffers 120 to 12n, respectively, shown in FIG. 3, while the data receiving circuits 220 to 22n comprise, for example, the receiving latches 140 to 14n and receiving buffers 150 to 15n, respectively, shown in FIG. 3.

As shown in FIG. 5, in the signal transmission system of this example, the outputs of the data receiving circuits 22 are supplied to the respective phase shift detection circuits 230 to 23n to detect phase shifts on the respective data signal lines 130 to 13n. Then, the phase shift detection circuits 230 to 23n feed the codes CODE (timing adjusting codes CODE0 to CODEn) for correcting for the phase shifts detected on the respective data signal lines 130 to 13n, back to the data transmitting circuits 210 to 21n; based on the codes CODE (skew information), the timings to output data from the data transmitting circuits 210 to 21n are adjusted by the data transmitting circuits 210 to 21n (timing adjusting circuits 200 to 20n) so that the data can be received with the optimum timing.

Here, rather than providing the phase shift detection circuit for each of the data signals (data signal lines 130 to 13n), only one phase shift detection circuit, for example, may be provided in the system, with provisions made to adjust the timing for each data signal in sequence, thereby reducing the amount of circuitry. Further, rather than feeding the timing adjusting codes CODE back to the transmitting end (the timing adjusting circuits 200 to 20n in the data transmitting circuits 210 to 21n), provisions may be made to transmit code increment or decrement signals instead of the timing adjusting codes themselves, and to generate the timing adjusting codes in the data transmitting circuits based on the increment or decrement signals; in this case, the number of feedback signal lines can be reduced.

Figure 6:
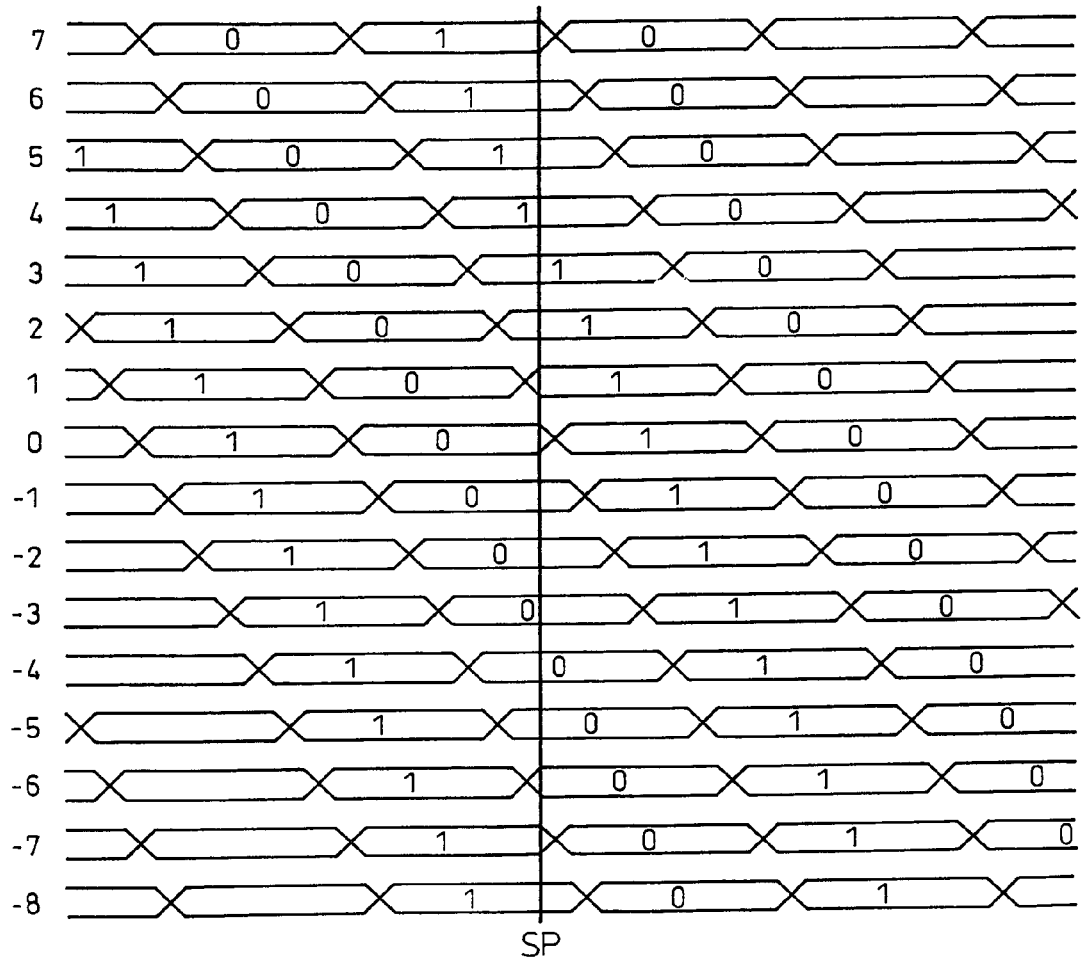
FIG. 6 is a diagram (part 1) for explaining the operation of a phase shift detection circuit in the signal transmission system of FIG. 5.

FIGS. 6 and 7 are diagrams for explaining the operation of the phase shift detection circuits in the signal transmission system of FIG. 5.

To described specifically, the phase shift detection circuit 230 receives the output of the data receiving circuit 220, and feeds the phase shift correcting code CODE (timing adjusting code CODE0) back to the data transmitting circuit 210 (timing adjusting circuit 200); in operation, the phase shift detection circuit 230 instructs the data transmitting circuit 220 through a feedback signal whose transmission timing is shifted so as to cover the entire range that needs timing adjustment, and based on the resulting data (skew information), the code that provides the optimum receive timing in the data receiving circuit 220 is selected.

For example, when 16 bit signals from +7 to −8 are used for the phase adjusting code CODE as shown in FIG. 6, the received data for the codes +7 to −8 at the data sampling position SP of the data receiving circuit 220 are as shown in FIG. 7. That is, when the received data for the phase adjusting codes +7 to +1 (and −7 and −8) is "1", and the received data for the phase adjusting codes 0 to −6 is "0", it is seen that the data change point is located between the phase adjusting codes +1 and 0 as well as between the phase adjusting codes −6 and −7, so that the timing (position) optimum for receiving the data is the phase adjusting code −3.

Then, the phase adjusting code CODE (skew information) indicating −3 is fed back from the phase shift detection circuit 230 to the data transmitting circuit 210 (timing adjusting circuit 200) and, by notifying the transmitting end using the feedback signal again, the timing adjustment can be accomplished.

Figure 8:
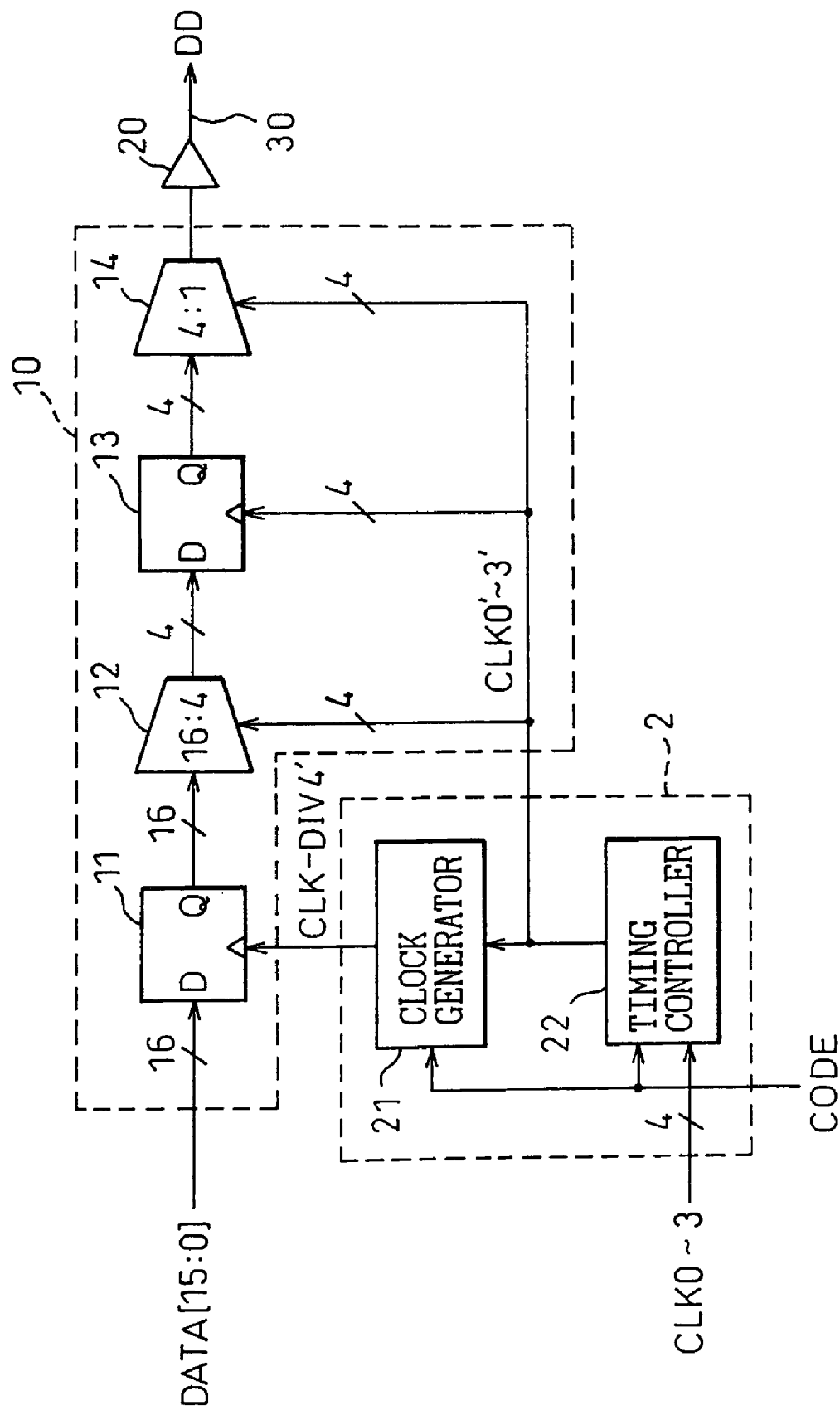
FIG. 8 is a block diagram schematically showing a first embodiment of a transmitting circuit in the signal transmission system of the present invention.

FIG. 8 is a block diagram schematically showing a first embodiment of the transmitting circuit in the signal transmission system of the present invention, illustrating an example in which 16-bit parallel data DATA input into the transmitting circuit is converted into serial data (DD) for high speed transmission. In the signal transmission system of the present invention, a plurality of such transmitting circuits (for example, n+1 circuits) are provided to transmit signals in parallel over the respective signal lines.

In FIG. 8, reference numeral 2 is a timing adjusting circuit, 10 is a transmit data processing block (transmitting latch), 20 is a transmitting buffer, and 30 is a signal line (data signal line). When the first embodiment is compared with FIG. 3, the timing adjusting circuit 2 corresponds to each of the timing adjusting circuits 200 to 20n, the transmit data processing block corresponds to each of the transmitting latches 110 to 11n, the transmitting buffer 20 corresponds to each of the transmitting buffers 120 to 12n, and the signal line 30 corresponds to each of the signal lines 130 to 13n. When the first embodiment is compared with FIG. 5, each of the data transmitting circuits 210 to 21n in FIG. 5 comprises the timing adjusting circuit 2, the transmit data processing block 10, and the transmitting buffer 20.

The transmit data processing block 10 generates serial data (DD) of a data rate of 2.5 Gbps, for example, from 16-bit parallel data DATA [15:0] of a data rate of 156 Mbps (156.25 Mbps/sec.), and outputs the data on the signal line 30 via the transmitting buffer 20. The clocks CLK0 to CLK3 (CLK0' to CLK3') for driving the transmitting circuit (transmit data processing block 10 and timing adjusting circuit 2) are supplied as a four-phase clock with phases spaced 90° apart and a frequency (625 MHz) one-quarter of the serial data transfer speed (2.5 GHz). Here, the number of bits of the parallel data DATA, the frequency of the transmitting circuit driving clocks, the phase difference between the clocks, etc. are determined according to the configuration, operating speed, etc. of the signal transmission system, and are not limited to those shown in the above configuration.

As shown in FIG. 8, the timing adjusting circuit 2 comprises a clock generator 21 and a timing controller 22, and the transmit data processing block 10 comprises D-type flip-flops 11 and 13 and multiplexers 12 and 14.

The phase of the four-phase clock CLK0 to 3 is adjusted by the timing controller 22 in accordance with the control code (timing control code) CODE in such a manner as to compensate for the skew of the data to be transmitted to the receiving circuit (receiving latch) via the signal line 30. The 16-bit parallel data DATA (156 Mbps) input into the transmit data processing block 10 is latched into the flip-flop 11 whose latch timing is controlled by a clock CLK-DIV4' (frequency: 156 (156.25) MHz); the clock CLK-DIV4' is generated by frequency-dividing by four the four-phase clock CLK0' to CLK3' whose phase has been adjusted in accordance with the control code CODE so as to provide optimum timing for the receiving latch.

The data latched by the clock CLK-DIV4' is converted into four-bit parallel data (625 Mbps) by the multiplexer 12 supplied with the clocks CLK0' to CLK3', and the four-bit parallel data is supplied to the flip-flop 13. Here, the data latch timing of the flip-flop 13 is controlled by the four-phase clock CLK0' to CLK3' whose phase has been adjusted in accordance with the control code CODE so as to provide optimum timing for the receiving latch. The output of the flip-flop 13 is supplied to the multiplexer 14 supplied with the clocks CLK0' to CLK3', and is converted into serial data (2.5 Gbps); the serial data (DD) is output on the signal line 30 via the transmitting buffer (output driver) 20.

By configuring each transmitting circuit (each of the data transmitting circuits 210 to 21n in FIG. 5) as described above, and compensating for the skew on the signal line 30 (130 to 13n), the data can be latched with optimum timing at the receiving circuit side (220 to 22n: receiving latches 150 to 15n), and high-speed, error-free data transmission can thus be accomplished without concern for the skew on the signal line. The values given above for the various clocks and signal data speeds and frequencies are for illustrative purposes only, and may be changed in various ways.

Figure 9:
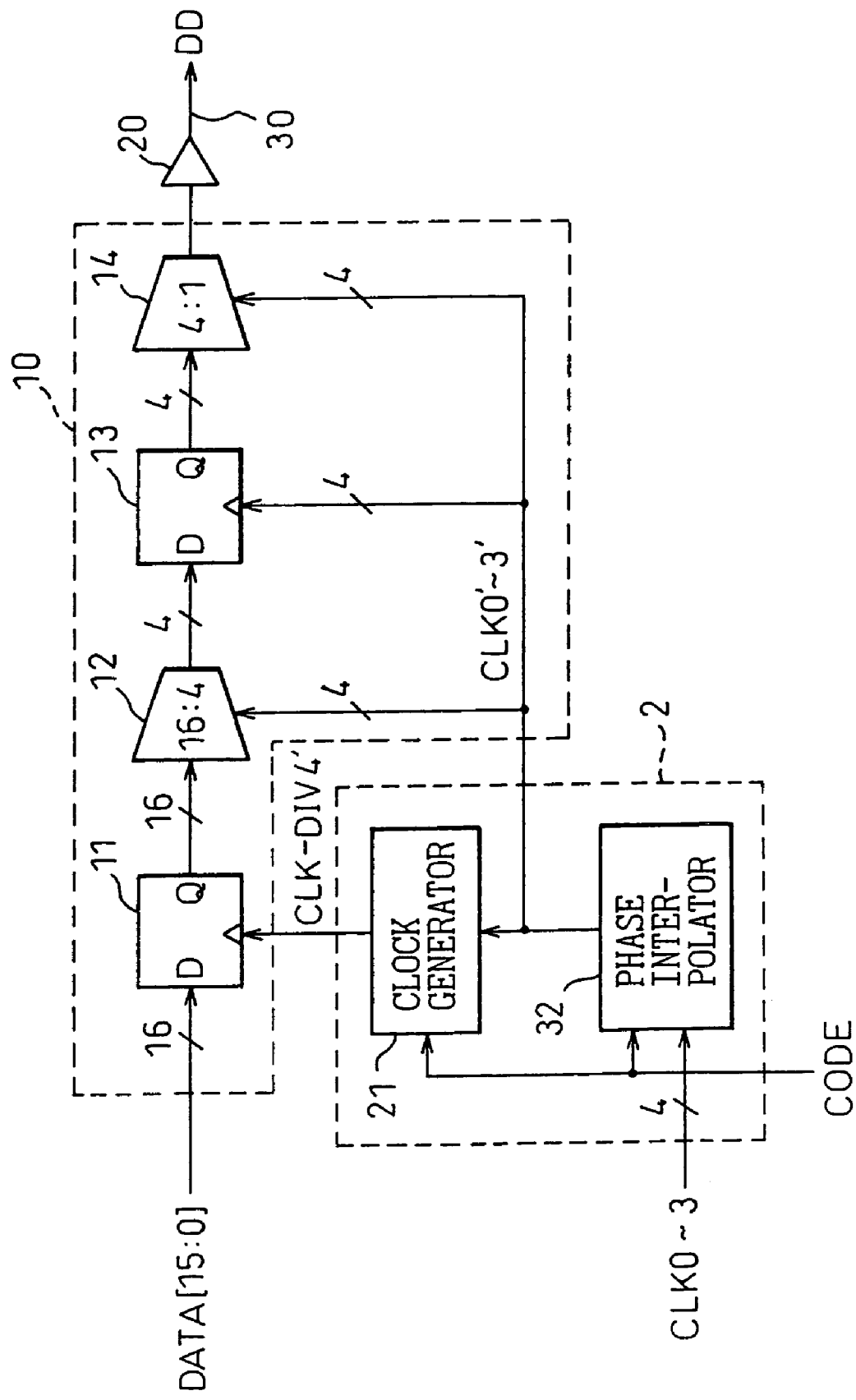
FIG. 9 is a block diagram schematically showing a second embodiment of the transmitting circuit in the signal transmission system of the present invention.

FIG. 9 is a block diagram schematically showing a second embodiment of the transmitting circuit in the signal transmission system of the present invention; in this embodiment, the timing controller 22 in the transmitting circuit shown in FIG. 8 is constructed from a phase interpolator 32.

The phase interpolator 32 is supplied with two pairs of differential clocks (four-phase clock with phases spaced 90° apart) CLK0 to CLK3 and generates two pairs of differential clocks intermediate between them by weighting with the control code CODE. The details of the phase interpolator 32 will be described later with reference to FIG. 11.

Figure 10:
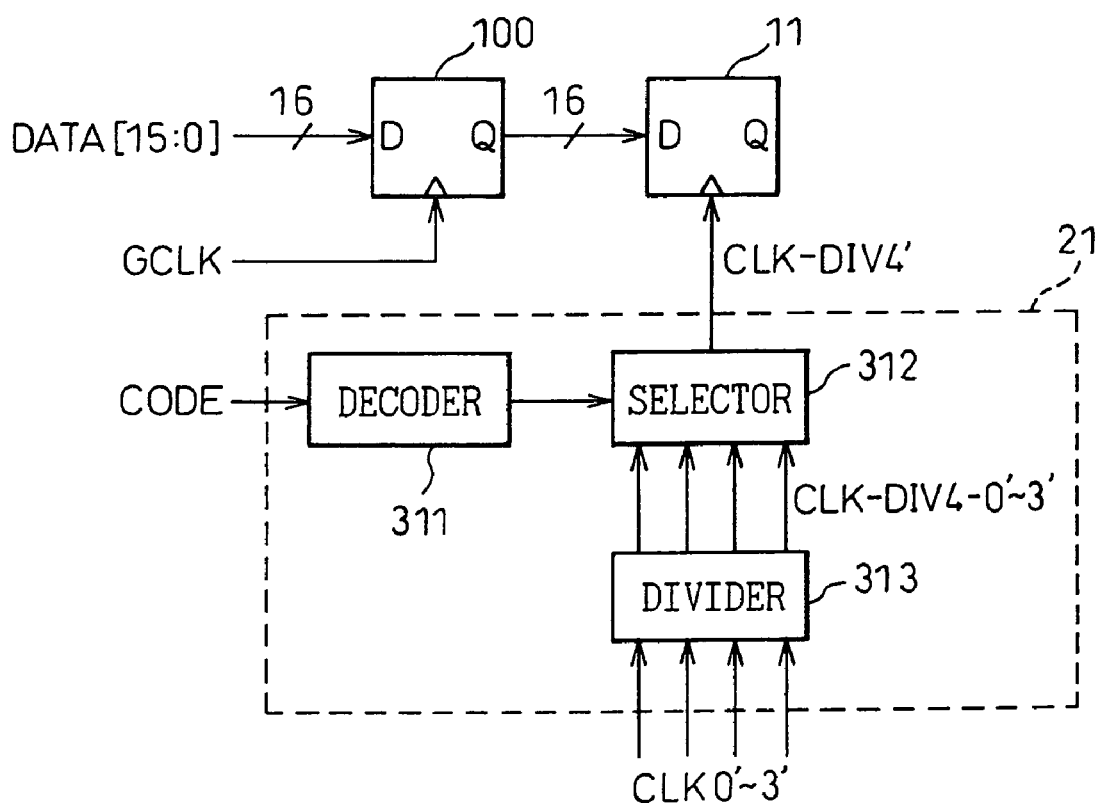
FIG. 10 is a block diagram showing one example of a clock generator in the transmitting circuit of FIG. 9.

FIG. 10 is a block diagram showing one example of the clock generator 21 in the transmitting circuit of FIG. 9. As shown in FIG. 10, the clock generator 21 comprises a decoder 311, a selector 312, and a divider 313. In FIG. 10, the flip-flop 11 is preceded by a D-type flip-flop (clock switching flip-flop) 100 whose latch timing for data DATA is controlled by a global clock GCLK (common clock).

As shown in FIG. 10, DATA [15:0] is supplied, via the clock switching flip-flop 100 controlled by the global clock GCLK, to the flip-flop 11 whose data latch timing is controlled by a given clock CLK-DIV4'. The clock CLK-DIV4' is generated by decoding the control code CODE by the decoder 311, and by selecting a clock of the timing corresponding to the control code CODE by the selector 312; here, the selector 312 is supplied with clocks CLK-DIV4-0' to CLK-DIV4-3' derived by frequency dividing in the divider 313. More specifically, the clocks CLK0' to CLK3' output from the phase interpolator (timing controller) 32 are 625-MHz clocks, and the clocks CLK-DIV4-0' to CLK-DIV4-3' derived by frequency dividing in the divider 313 are 156-MHz clock.

That is, when converting the parallel data into serial data by using the clocks CLK0' to CLK3' generated by phase-correcting (phase-adjusting) the clocks CLK0 to CLK3 having proper timing with respect to the global clock GCLK, since the clocks CLK0' to CLK3' are phase-corrected by the timing adjusting codes CODE, the data DATA [15:0] cannot be latched directly by the clocks CLK0' to CLK3'. Therefore, by referring to the control code CODE, the selector 312 selects the clock (CLK-DIV4') having an optimum phase relationship to the clocks CLK0' to CLK3' from among the four clocks CLK-DIV4-0' to CLK-DIV4-3' generated by the divider 313 by dividing the clocks CLK0' to CLK3' by four. After switching the data from the global clock GCLK to the clock CLK-DIV4' selected by the selector 312, the parallel-to-serial conversion is performed by the flip-flop 13 and multiplexers 12 and 14 using the clocks CLK0' to CLK3'.

Figure 11:
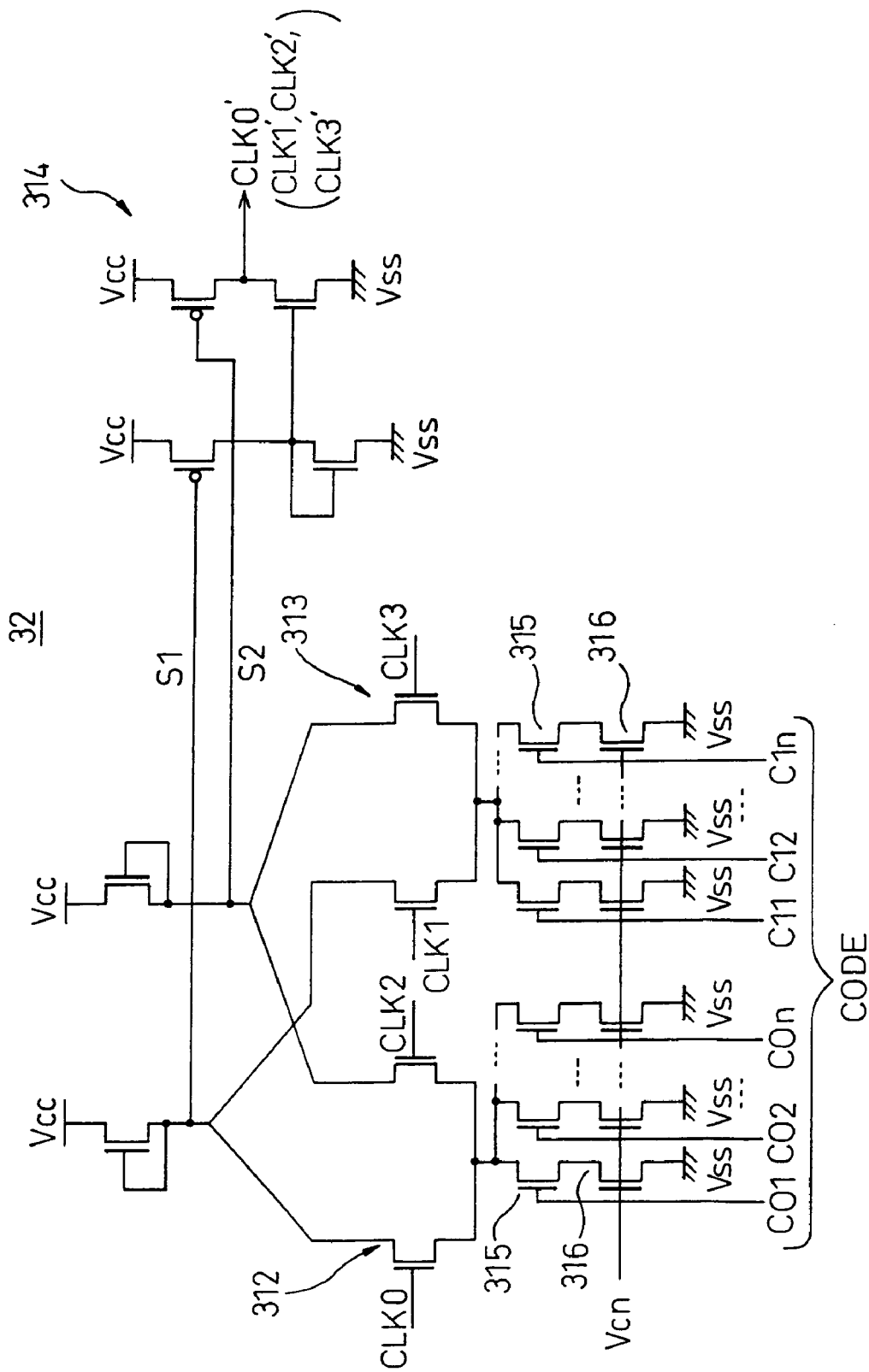
FIG. 11 is a block diagram showing one example of a phase interpolator in the transmitting circuit of FIG. 9.

FIG. 11 is a block diagram showing one example of the phase interpolator 32 in the transmitting circuit of FIG. 9.

As shown in FIG. 11, in the phase interpolator 32, the four-phase input clocks CLK0 to CLK3 are weighted and summed by varying the bias current (tail current) to two differential amplifier stages 312 and 313, and the signals S1 and S2 from the two differential amplifiers 312 and 313 are passed through a comparator 314 to obtain an output (clock CLK0' (CLK1', CLK2', CLK3')) having a phase intermediate between the two signals S1 and S2. Here, the input clocks CLK0 to CLK3 are weighted in the respective differential amplifiers 312 and 313 by using a plurality of control transistor pairs each consisting, for example, of two nMOS transistors connected in series, wherein one transistor (315) in each pair is supplied at its gate with the control code CODE (C01, C02, . . . , C0n; C11, C12, . . . , C1n), while the gates of the other transistors (316) in the respective pairs are connected in common and supplied with a control voltage (Vcn). The advantage in using the thus configured phase interpolator 311 is that highly precise timing adjustments can be achieved because the timing of the output signal (clocks CLK0' to CLK3') can be adjusted digitally with a finer resolution than would be possible with a single stage of delay units.

Figure 12:
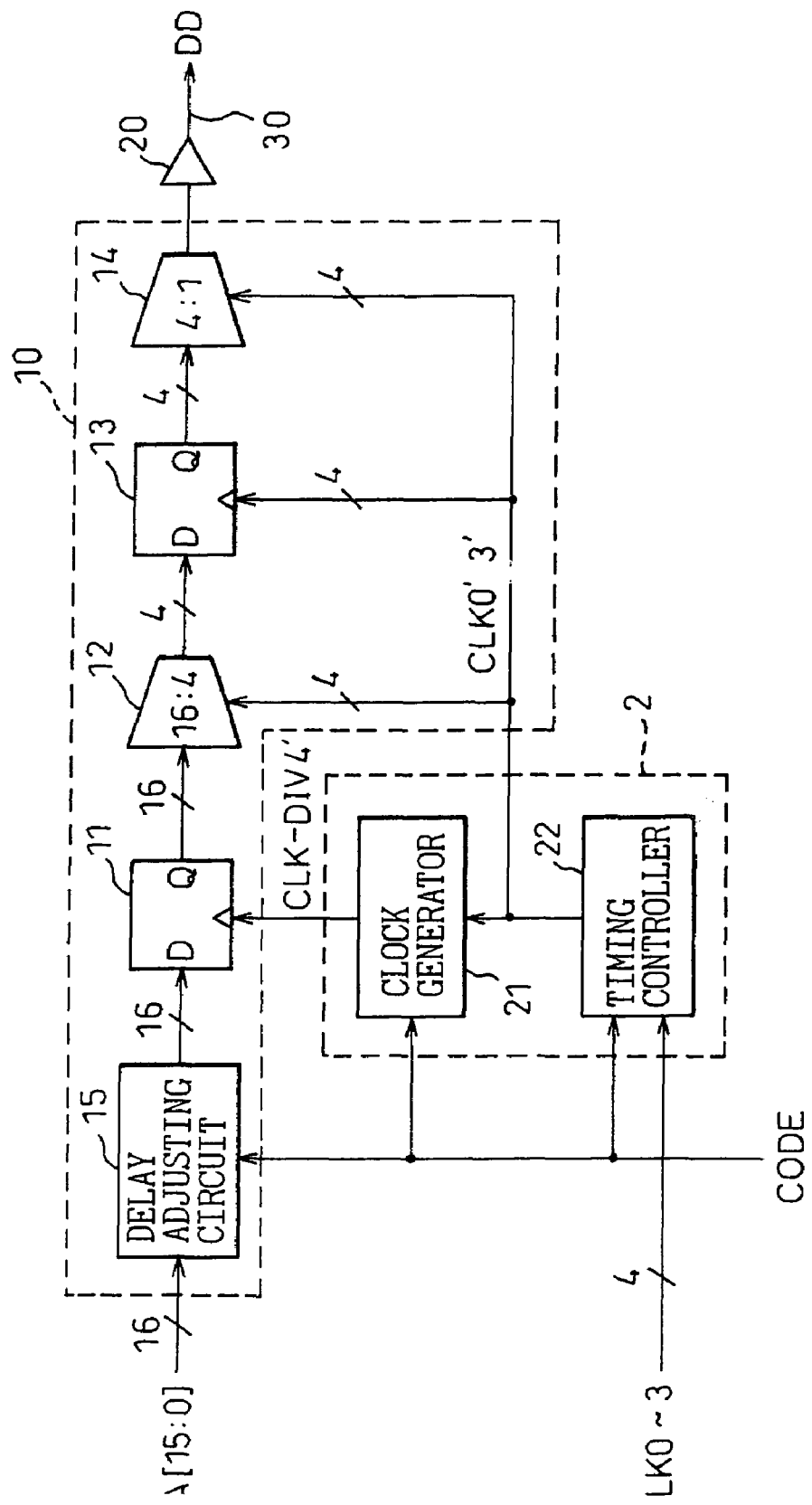
FIG. 12 is a block diagram schematically showing a third embodiment of the transmitting circuit in the signal transmission system of the present invention.

FIG. 12 is a block diagram schematically showing a third embodiment of the transmitting circuit in the signal transmission system of the present invention.

As is apparent from a comparison between FIG. 12 and FIG. 8, the transmit data processing block 10 in the third embodiment includes a delay adjusting circuit 15 preceding the flip-flop 11. That is, in the first embodiment previously shown in FIG. 8, when latching the data by the clock CLK-DIV4', there arises the possibility that a sufficient timing margin may not be provided between the data and the clock. In view of this, in the third embodiment, the delay adjusting circuit 15 to which the control code CODE is supplied variably adjusts the delay amount of the data in accordance with the amount of phase adjustment of the clock, thereby securing a sufficient operating margin.

Figure 13:
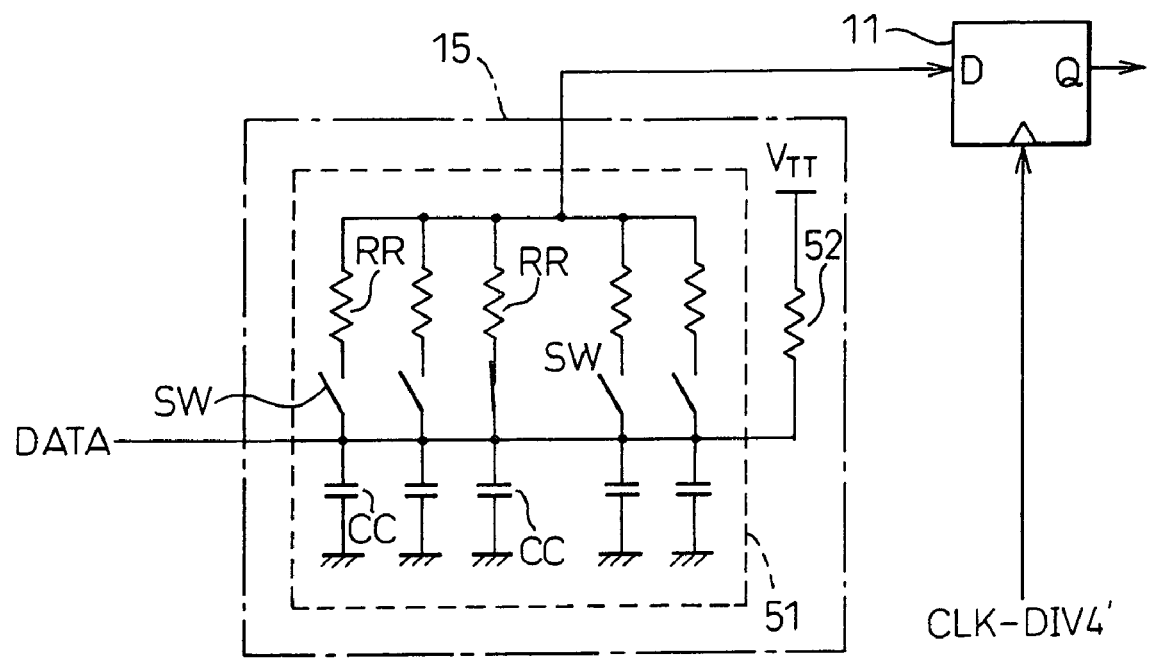
FIG. 13 is a circuit diagram showing one example of a delay adjusting circuit in the transmitting circuit of FIG. 12.

FIG. 13 is a circuit diagram showing one example of the delay adjusting circuit in the transmitting circuit of FIG. 12. In FIG. 13, reference numeral 51 is a tapped delay circuit, and 52 is a termination resistor.

As shown in FIG. 13, the flip-flop 11 uses the clock CLK-DIV4' directly as the input latch strobe signal (data latch signal), and instead, the delay adjusting circuit 15 adjusts the timing of the data DATA by inserting the tapped delay circuit 51 therein. Here, the tapped delay circuit 51 is, for example, a tapped transmission line formed from a thin-film circuit or a wiring line on a printed circuit board; a plurality of tappings, each consisting of a capacitor CC, a switch SW, and a resistor RR, are provided along the transmission line, and the delay amount of the data DATA is controlled variably by turning the desired switch SW on. A variable delay circuit having, for example, a transmission distance of about 5 cm and a maximum delay amount of about 1 nsec. can be used as the tapped delay circuit 51. It will, however, be appreciated that a variable delay circuit of any other configuration can be used as the tapped delay circuit 51 as long as the circuit is capable of delaying an analog signal (data DATA).

Figure 14:
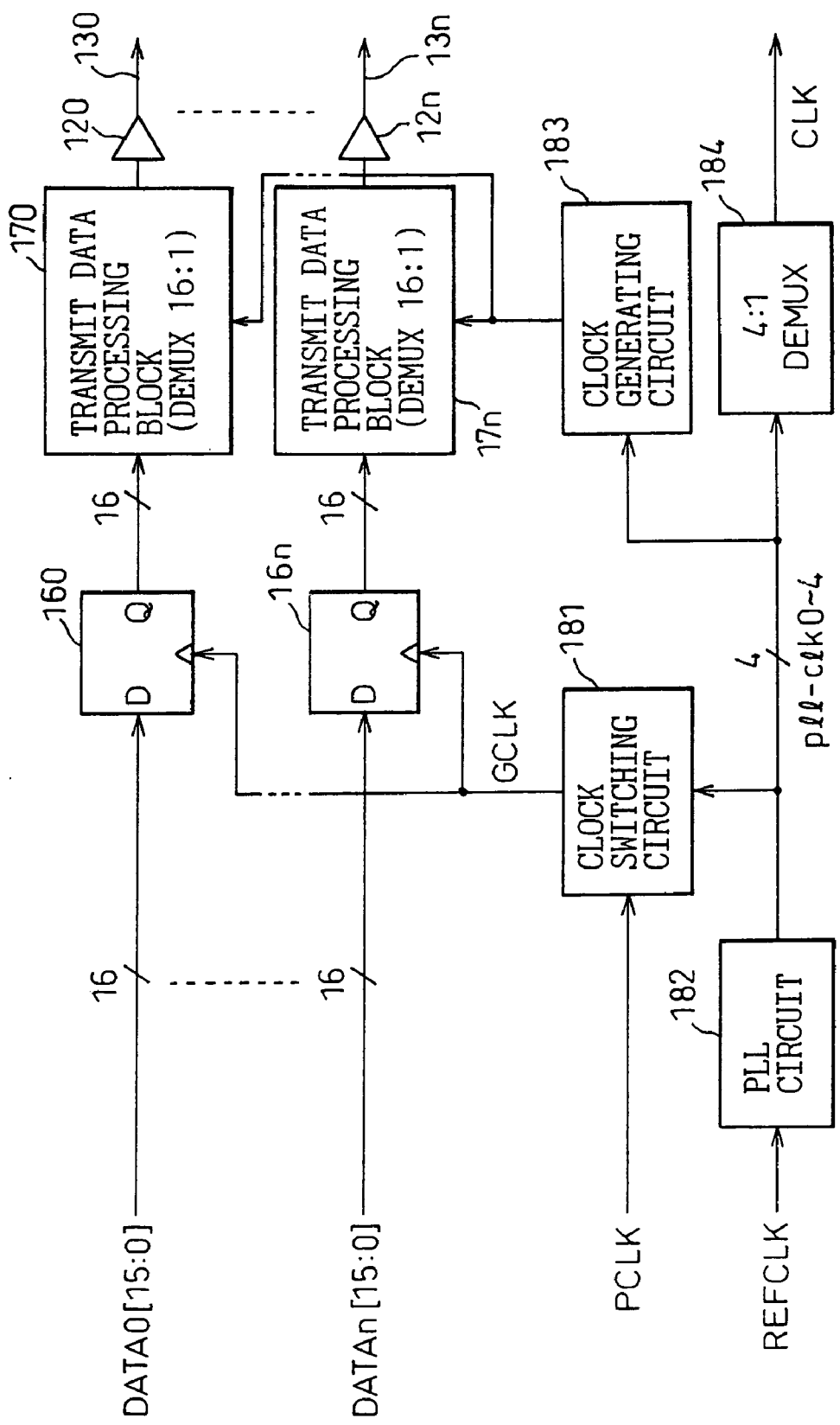
FIG. 14 is a block diagram schematically showing a fourth embodiment of the transmitting circuit in the signal transmission system of the present invention.

FIG. 14 is a block diagram schematically showing a fourth embodiment of the transmitting circuit in the signal transmission system of the present invention; a plurality of transmitting circuits are shown here. In FIG. 14, reference numeral 160 to 16n are D-type flip-flops, 170 to 17n are the transmitting circuits, 181 is a clock switching circuit, 182 is a PLL (Phase Locked Loop) circuit, 183 is a clock generating circuit, and 184 is a demultiplexer (DEMUX).

Here, the flip-flops 160 to 16n each correspond, for example, to the clock switching flip-flop 100 shown in FIG. 10, and the transmitting circuits 170 to 17n each correspond, for example, to the transmit data processing block 10 shown in FIG. 8. As previously explained, for example, with reference to FIG. 8, the transmitting circuits 170 to 17n each have the function of a 16:1 demultiplexer that converts 16-bit parallel data of a data rate of 156 Mbps into serial data of a data rate of 2.5 Gbps.

As shown in FIG. 14, in the transmitting circuit of the fourth embodiment, the 16-bit parallel data DATA0 [15:0] to DATAn [15:0] supplied to the transmit data processing blocks 170 to 17n (flip-flops 160 to 16n) are all input in synchronism with the same data input clock PCLK (common clock). However, since the data input clock PCLK synchronized to the parallel data is usually transmitted through logic circuitry, phase variation (jitter) increases due to the characteristics of the clock propagating logic circuitry, noise, and other factors. In view of this, in the transmitting circuit of the fourth embodiment, a high-speed signal transmission clock CLK (for example, with a frequency of 2.5 GHz) is generated separately from the data input clock PCLK from a reference clock REFCLK whose jitter is reduced.

That is, the signal transmission clock CLK used for signal transmission is generated by the PLL circuit 182 by multiplying the frequency of the reference clock REFCLK. Though there is a predetermined frequency relationship between the data input clock PCLK and the reference clock REFCLK, the data input clock PCLK and the reference clock REFCLK are out of phase with each other. Therefore, switching from the data input clock PCLK to the signal line transmitting circuit driving clock p11-clk0 to p11-clk3 (the signal transmission clock CLK) generated by the PLL circuit 182 is performed by the clock switching circuit 181. In the fourth embodiment, the PLL circuit 182 outputs a four-phase clock (p11-clk0 to p11-clk3) having, for example, phases spaced 90° apart and a frequency of 625 MHz, and the demultiplexer 184 generates the signal transmission clock CLK having, for example, a frequency of 1.25 GHz from the four-phase clock p11-clk0 to p11-clk3.

Figure 15:
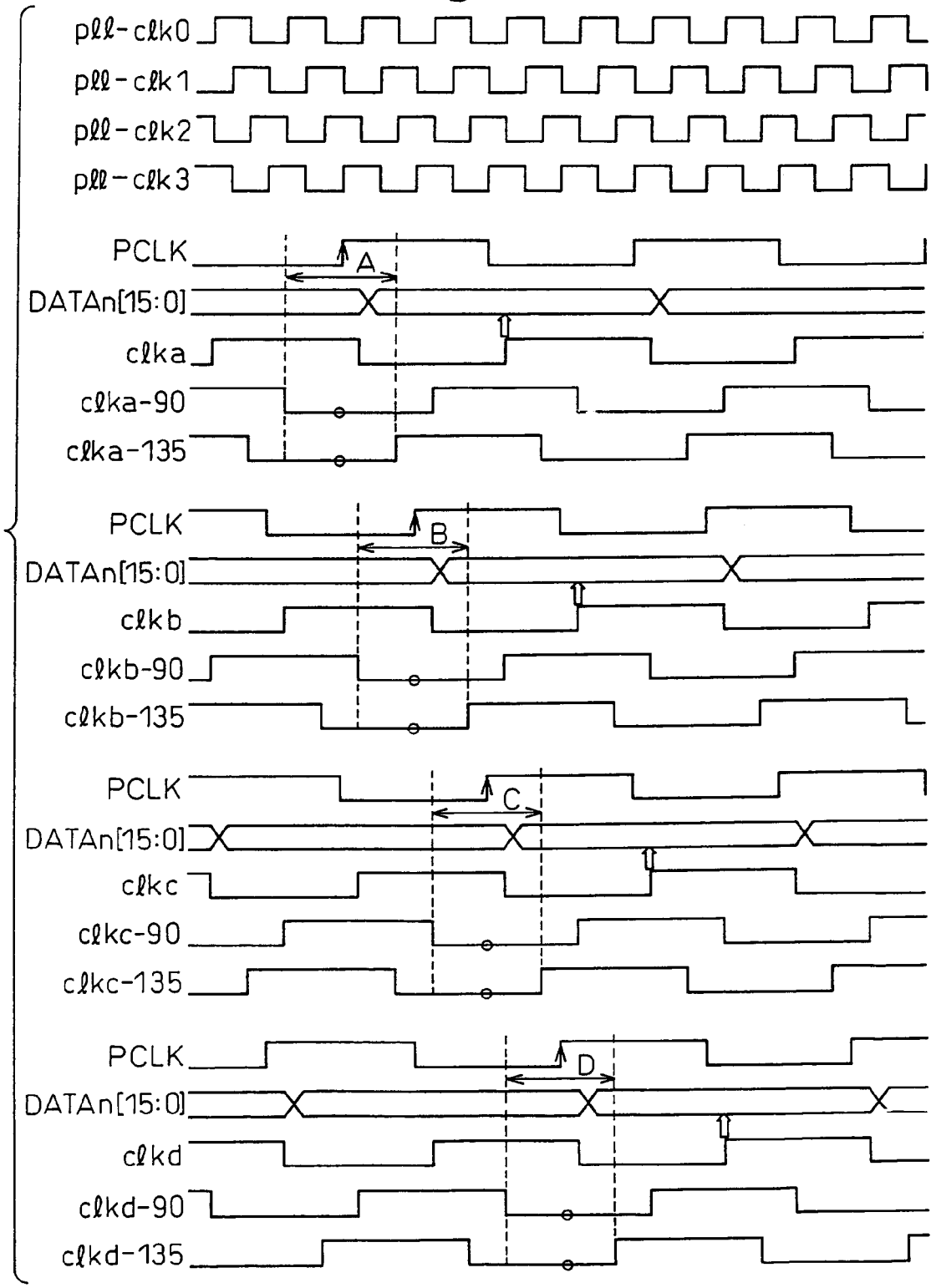
FIG. 15 is a diagram for explaining the operation of a clock switching circuit in the transmitting circuit of FIG. 14.

FIG. 15 is a diagram for explaining the operation of the clock switching circuit in the transmitting circuit of FIG. 14.

As shown in FIG. 15, using the four-phase clock p11-clk0 to p11-clk3 output from the PLL circuit 182 and having phases spaced 90° apart and a frequency of 625 MHz, the clock switching circuit 181 generates a clock clka having a frequency of 156 MHz, a clock clka-90 advanced in phase by 90° with respect to the clock clka, and a clock clka-135 advanced in phase by 135° with respect to the clock clka. When the rising edge of the data input clock PCLK occurs during the period that the clocks clka-90 and clka-135 are both at the low "L" level, the DATAn [15:0] (16-bit parallel input data DATA0 [15:0] to DATAn [15:0]) input in synchronism with the data input clock PCLK is latched into the clock switching flip-flop 16n (160 to 16n) by the rising edge of the clock clka. That is, the clock clka is selected as the optimum clock (the clock having a sufficient margin for both setup and hold), and is distributed to the respective channels (clock switching flip-flops 160 to 16n) as the common clock to the transmitting circuits.

If the position of the data input clock PCLK does not satisfy the above condition, a clock clkb delayed in phase by 90° with respect to the clock clka, a clock clkb-90 advanced in phase by 90° with respect to the clock clkb, and a clock clkb-135 advanced in phase by 135° with respect to the clock clkb are generated, and when the rising edge of the data input clock PCLK occurs during the period that the clocks clkb-90 and clkb-135 are both at the low "L" level, the DATAn [15:0] input in synchronism with the data input clock PCLK is latched into the clock switching flip-flop 16n by the rising edge of the clock clkb.

If the data input clock PCLK is not at the optimum position with respect to the clock clkb either, then a comparison is made with a clock clkc and then with a clock clkd in like manner, and finally one of the clocks clka to clkd is selected. That is, the data input clock PCLK is compared with the four phase clocks (clka, clkb, clkc, and clkd) generated from the outputs (clocks p11-clk0 to p11-clk3) of the PLL circuit 182 and having the same frequency as that of the data input clock PCLK but shifted in phase relative to one another, and the clock (clka) having the phase relationship best suited to latch the parallel data (DATAn [15:0]) synchronized to the data input clock PCLK is selected and supplied to the plurality of clock switching flip-flops 160 to 16n, thus making it possible to transmit the data over the plurality of signal lines 130 to 13n synchronously with one clock.

Figure 16:
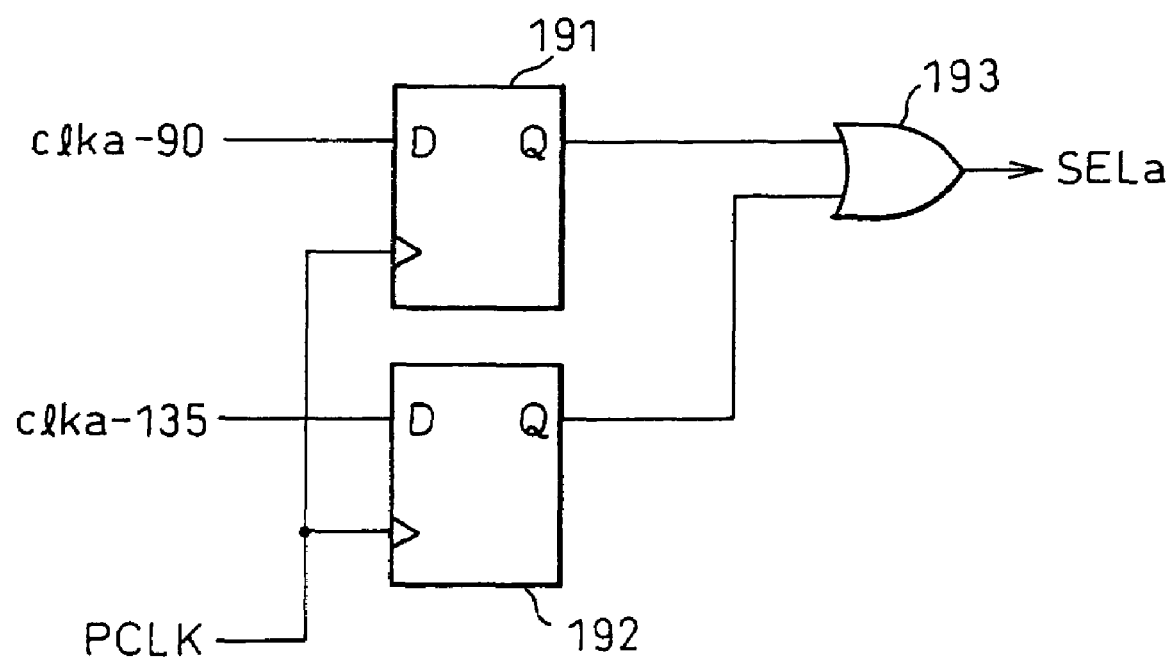
FIG. 16 is a circuit diagram showing one example of a PCLK position detection circuit that can be applied to the clock switching circuit in the transmitting circuit of FIG. 14.

FIG. 16 is a circuit diagram showing one example of a PCLK position detection circuit that can be applied to the clock switching circuit in the transmitting circuit of FIG. 14. The operation of the clock switching circuit 181 described with reference to FIG. 15 can be implemented by applying the PCLK position detection circuit 190 shown in FIG. 16.

As shown in FIG. 16, the PCLK position detection circuit 190 comprises two D-type flip-flops 191 and 192 and an OR gate 193. The data terminal D of the flip-flop 191 is supplied with the clock clka-90 advanced in phase by 90° with respect to the clock clka, and the data terminal D of the flip-flop 192 is supplied with the clock clka-135 advanced in phase by 135° with respect to the clock clka, while the data latch terminal of each of the flip-flops 191 and 192 is supplied with the data input clock PCLK. With this configuration, the flip-flops 191 and 192 latch the respective clocks clka-90 and clka-135 by the rising edge of the data input clock PCLK. The outputs of the flip-flops 191 and 192 are supplied to the OR gate 193, and when the output of the OR gate 193 is at the low level "L", that is, when the rising edge of the data input clock PCLK occurs during the period that the clocks clka-90 and clka-135 are both at the low level "L", a select signal SELa of a low level "L" is output to select the clock clka.

Here, the PCLK position detection circuit or the clock switching circuit can, of course, be modified in various ways.

As described above, according to each embodiment of the present invention, since the latch timing for the signal transmitted over each signal line is optimized at the transmitting end for each signal line, high-speed, error-free signal transmission can be achieved.

As described in detail above, according to the present invention, there is provided a signal transmission system that can transmit large-capacity, error-free signals at high speed using a plurality of signal lines without being affected by skew.

Figure 17:
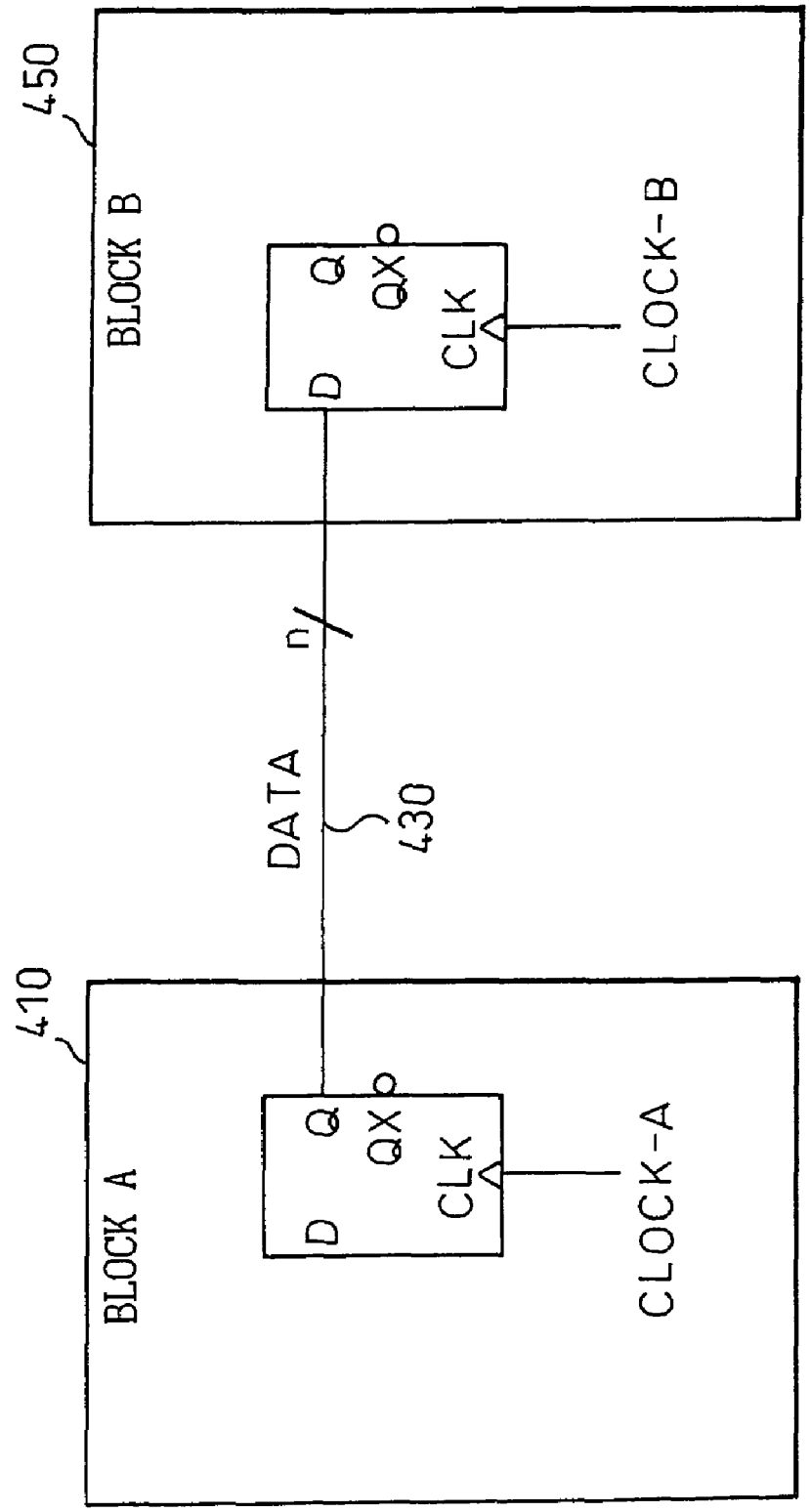
FIG. 17 is a block diagram schematically showing another example of the prior art signal transmission system.

FIG. 17 is a block diagram schematically showing another example of the prior art signal transmission system.

The signal transmission system shown in FIG. 17 comprises, for example, a first circuit (block A) 410 which uses a clock CLOCK-A, a second circuit (block B) 450 which uses a clock CLOCK-B, and an n-bit wide signal transmission line (bus) 430 over which signals (data) are transferred between the first circuit 410 and the second circuit 450. The first circuit 410 is, for example, a core circuit in an ASIC (Application Specific IC), and the second circuit 450 is a high-speed I/O circuit. The clocks CLOCK-A and CLOCK-B are clocks having the same frequency but differing in phase.

More specifically, FIG. 17 shows an alterative example of the signal transmission system that includes a clock switching circuit for clock switching between the synchronous circuits (circuits 410 and 450); that is, n-bit data is transmitted from the first circuit 410 using the clock CLOCK-A, and the n-bit data transmitted over the signal transmission line 430 is received by the second circuit 450 using the CLOCK-B.

In the prior art signal transmission system shown in FIG. 17, if the clocks CLOCK-A and CLOCK-B are of the same frequency, they have a nonzero phase difference between them. If this phase difference is sufficiently small compared with the cycle of the synchronous circuit, it will not present a problem, and this phase difference is basically not dependent on the cycle or the frequency.

As a result, in the prior art signal transmission system shown in FIG. 17, as the cycle becomes shorter (the frequency increases), the proportion of the phase difference to the cycle increases, and may eventually reach such a level that data cannot be received correctly.

In view of the above problem associated with the prior art signal transmission system, it is an object of the present invention to provide a signal transmission system that can perform high-speed, error-free signal transmission by generating a clock that can ensure reliable signal reception by accounting for the phase difference.

Embodiments of the timing signal generating circuit, signal transmission system, and timing signal generating method according to the present invention will be described in detail below with reference to the accompanying drawings.

Figure 18:
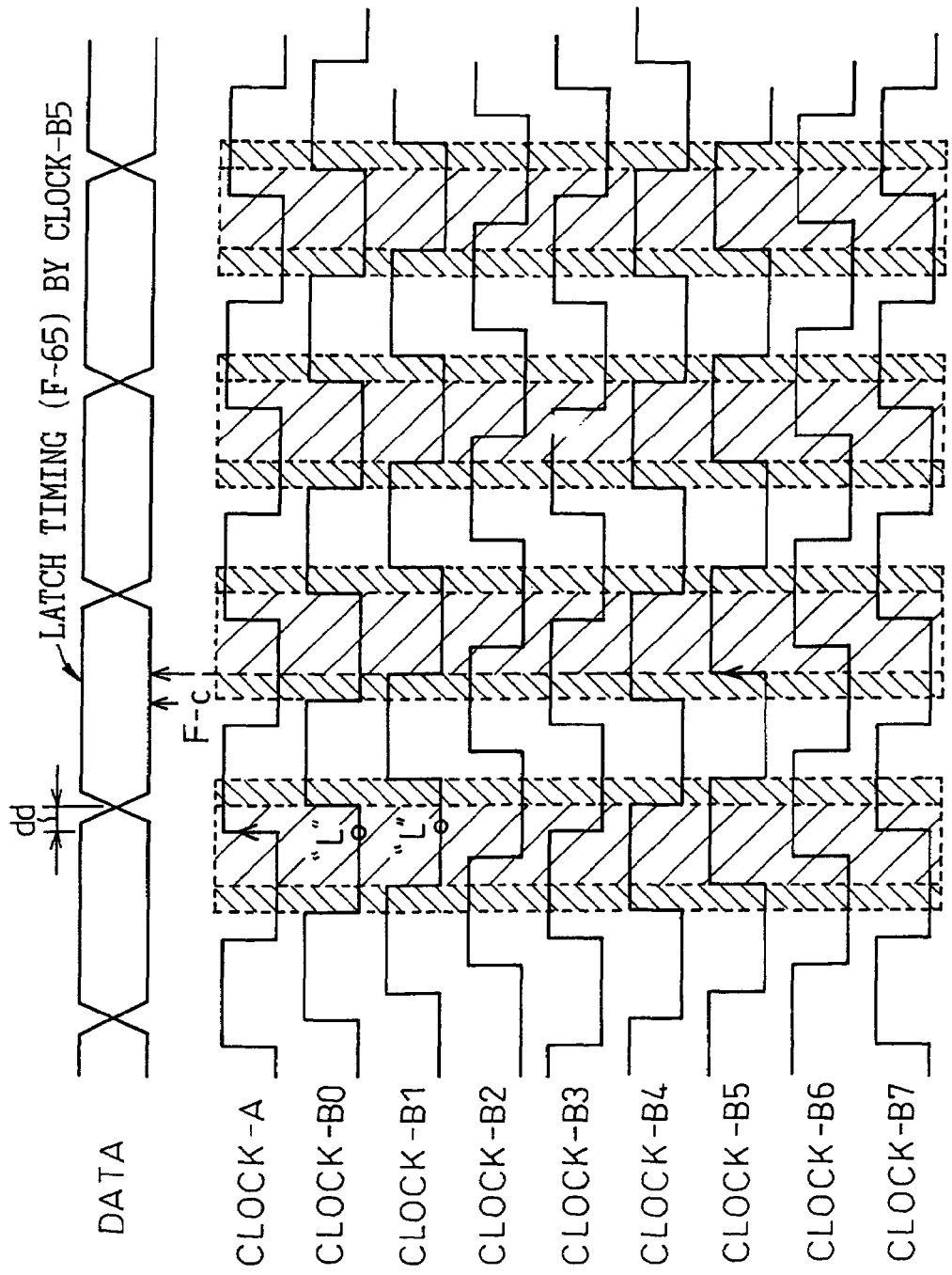
FIG. 18 is a timing diagram for explaining one example of a timing signal generating method according to the present invention.
Figure 19:
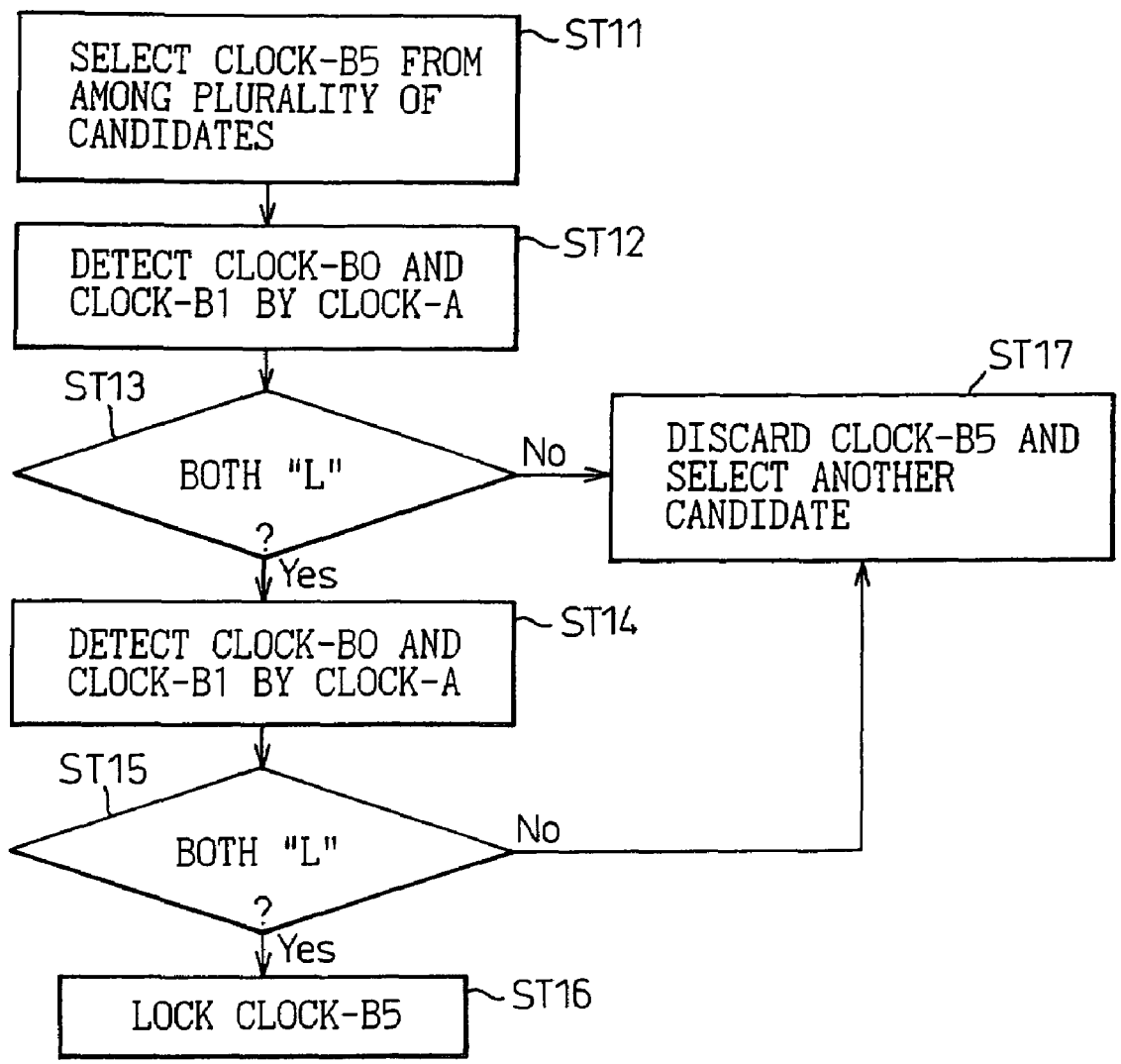
FIG. 19 is a diagram for explaining the timing signal generating method shown in FIG. 18.

FIG. 18 is a timing diagram for explaining one example of the timing signal generating method according to the present invention, and FIG. 19 is a diagram for explaining the timing signal generating method shown in FIG. 18. In FIGS. 18 and 19, reference character CLOCK-A indicates the clock used in a first circuit (for example, a core circuit in an ASIC), and CLOCK-B0 to CLOCK-B7 indicate the clocks used in a second circuit (for example, a high-speed I/O circuit in an ASIC, for data latching and determination of a clock to be selected (locked)). Here, the clocks CLOCK-B0 to CLOCK-B7 are eight-phase clocks with phases spaced 45° apart.

As shown in FIG. 19, in the example of the timing signal generating method according to the present invention, first the CLOCK-B5 (an arbitrary candidate clock) is selected in step ST11 from among a plurality of candidates, and in the next step ST12, the clocks CLOCK-B0 and CLOCK-B1 are detected by the clock CLOCK-A, that is, the levels of the clocks CLOCK-B0 and CLOCK-B1 are latched by the rising edge of the clock CLOCK-A. The process then proceeds to step ST13 to determine whether the levels of the clocks CLOCK-B0 and CLOCK-B1 latched by the rising edge of the clock CLOCK-A are both low "L".

If it is determined in step ST13 that the levels of the clocks CLOCK-B0 and CLOCK-B1 latched by the rising edge of the clock CLOCK-A are both low "L", the process proceeds to step ST14 where the levels of the clocks CLOCK-B0 and CLOCK-B1 are again latched by the rising edge of the clock CLOCK-A, as in step ST12, after which the process proceeds to step ST15. In step ST15, it is again determined, as in step ST13, whether the levels of the clocks CLOCK-B0 and CLOCK-B1 latched by the rising edge of the clock CLOCK-A are both low "L".

Then, if it is again determined in step ST15 that the levels of the clocks CLOCK-B0 and CLOCK-B1 latched by the rising edge of the clock CLOCK-A are both low "L", the candidate clock CLOCK-B5 is locked as an optimum clock. That is, the clock CLOCK-B5 is generated and used as a data latching clock in the second circuit.

On the other hand, if it is determined in step ST13 or ST15 that the levels of the clocks CLOCK-B0 and CLOCK-B1 latched by the rising edge of the clock CLOCK-A are not both low "L", the candidate clock CLOCK-B5 is discarded and another clock (for example, the clock CLOCK-B6) is selected as the candidate clock (step ST17), and the above process is repeated.

As described above, in the timing signal generating method shown in FIGS. 18 and 19, two test clocks (test timing signals) CLOCK-B0 and CLOCK-B1, for example, are defined for the candidate clock (receive timing signal) CLOCK-B5, and these test clocks CLOCK-B0 and CLOCK-B1 are detected twice, first in step ST13 and then in step ST15, to determine whether the clock CLOCK-B5 should be locked as the optimum clock; likewise, two test clocks CLOCK-B1 and CLOCK-B2 are defined for the candidate clock CLOCK-B6, and these test clocks CLOCK-B1 and CLOCK-B2 are detected twice, first in step ST13 and then in step ST15, to determine whether the clock CLOCK-B6 should be locked as the optimum clock.

The combination of the candidate clock and the test clocks can be changed according to the frequency, etc. of the clock used. That is, when the frequency of the clock is relatively low (for example, lower than a hundred and tens of MHz), the data latch timing (rise timing) of the candidate clock for detecting the test clocks is set approximately at the center (F-c) of the data (DATA) shown in FIG. 18; on the other hand, when the frequency of the clock is high (for example, several hundred MHz, i.e., 625 MHz or higher), it is preferable to set the timing at a point (for example, F-b5) delayed relative to the center of the data (DATA), as shown in FIG. 18. This is because, when the data transmission clock increases, account must be taken of the margin for the setup time rather than the data hold time.

Here, the number of test clocks (test timing signals: CLOCK-B0, CLOCK-B1) for one candidate clock (receive timing signal: CLOCK-B5) is not limited to 2, nor need the number of times (steps ST13, ST15) that the test clocks are detected be limited to 2.

Figure 20:
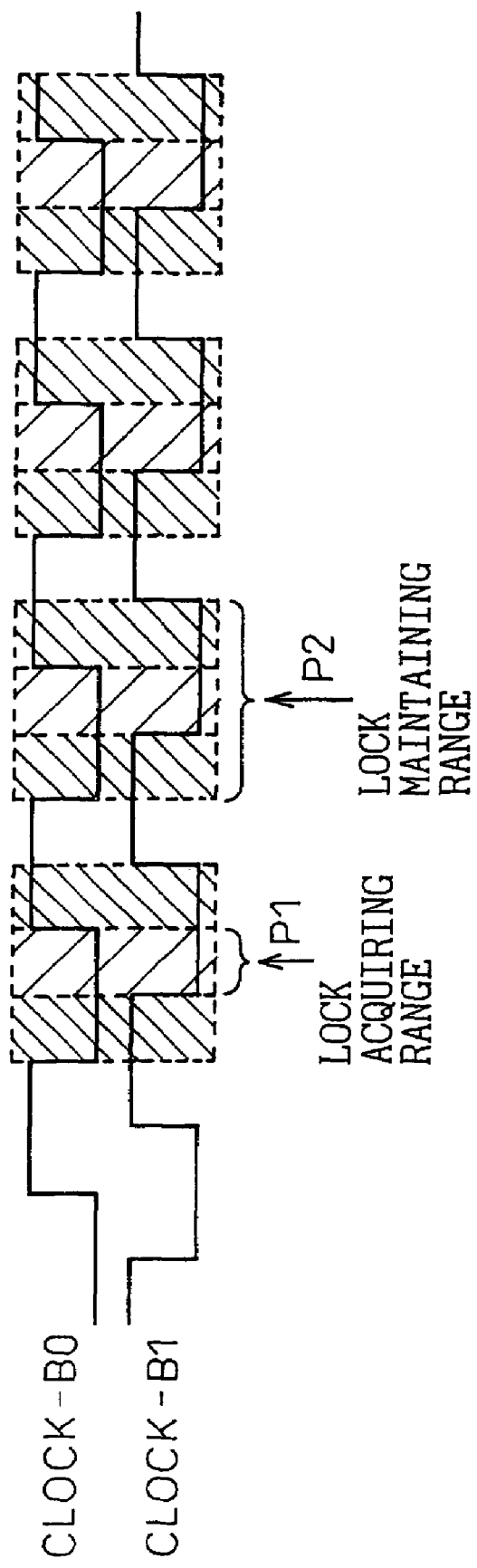
FIG. 20 is a timing diagram for explaining an alternative example of the timing signal generating method according to the present invention.
Figure 21:
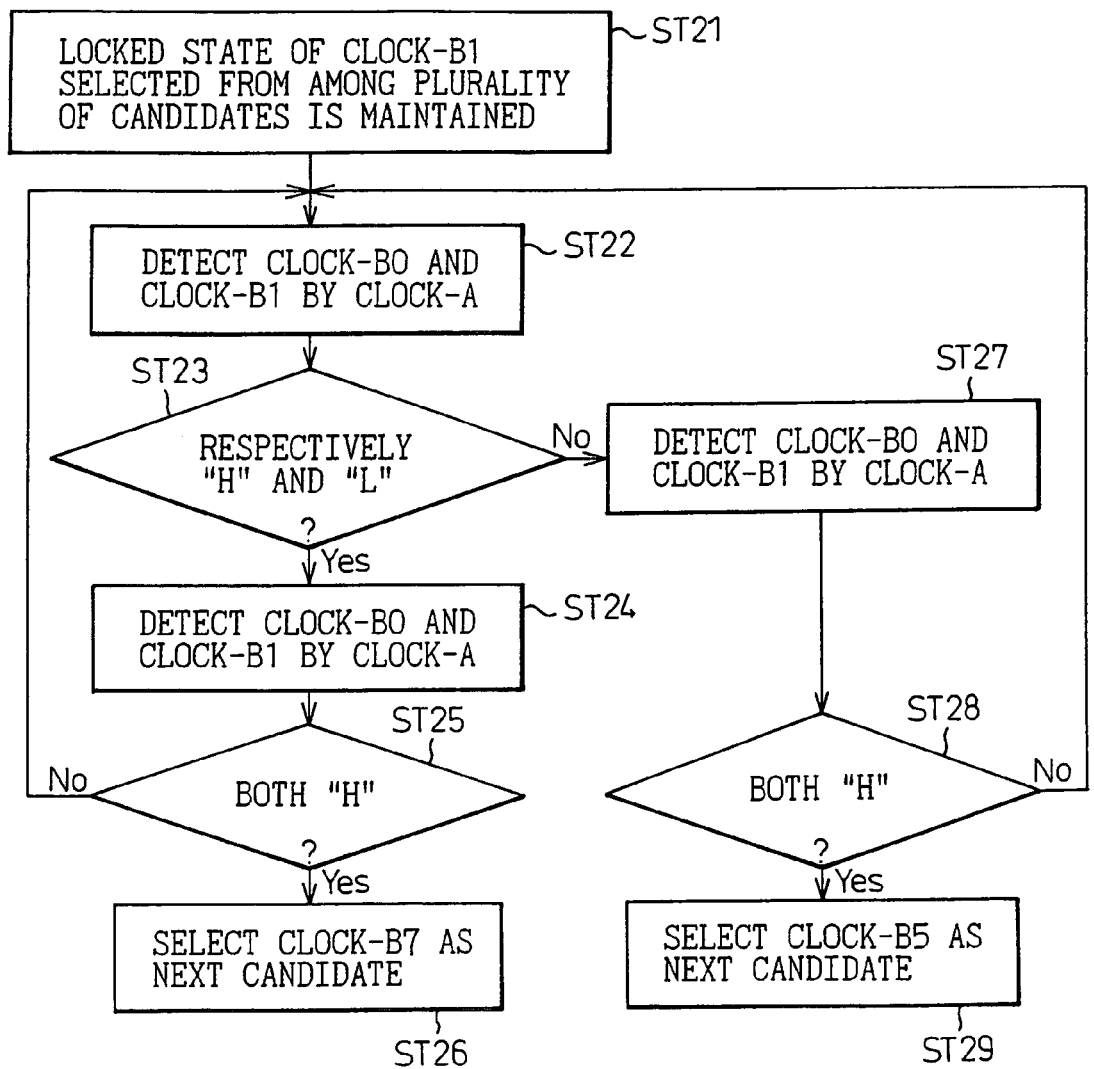
FIG. 21 is a diagram for explaining the timing signal generating method shown in FIG. 20.

FIG. 20 is a timing diagram for explaining an alternative example of the timing signal generating method according to the present invention, and FIG. 21 is a diagram for explaining the timing signal generating method shown in FIG. 20. The timing signal generating method shown in FIGS. 20 and 21 is a continuation of the timing signal generating method (selection and locking of a clock) described with reference to FIGS. 18 and 19, and concerns unlocking of the locked clock and selection of a new clock.

As shown in FIG. 20, in the alternative example of the timing signal generating method, the range over which the candidate clock (CLOCK-B5) is acquired as a locked clock by detecting the test clocks (CLOCK-B0, CLOCK-B1) is made smaller than the range (lock maintaining range) over which the locked state of the clock acquired by detecting the test clocks is maintained.

As shown in FIG. 21, in the alternative example of the timing signal generating method according to the present invention, from ST21 in which the locked state of the clock CLOCK-B5 selected from among the plurality of candidates is maintained, the process proceeds to ST22 where the clocks CLOCK-B0 and CLOCK-B1 are detected by the clock CLOCK-A, that is, the levels of the clocks CLOCK-B0 and CLOCK-B1 are latched by the rising edge of the clock CLOCK-A. The process then proceeds to step ST23 to determine whether the levels of the clocks CLOCK-B0 and CLOCK-B1 latched by the rising edge of the clock CLOCK-A are high "H" and low "L", respectively.

If it is determined in step ST23 that the levels of the clocks CLOCK-B0 and CLOCK-B1 latched by the rising edge of the clock CLOCK-A are high "H" and low "L", respectively, the process proceeds to step ST24 where the levels of the clocks CLOCK-B0 and CLOCK-B1 are again latched by the rising edge of the clock CLOCK-A, as in step ST22, after which the process proceeds to step ST25. Here, the phase (rise timing) of the clock CLOCK-B0 leads the phase (rise timing) of the clock CLOCK-B1 by 45°, as shown in FIG. 18.

In step ST25, it is determined whether the levels of the clocks CLOCK-B0 and CLOCK-B1 latched by the rising edge of the clock CLOCK-A are both high "H". If it is determined in step ST25 that the levels of the clocks CLOCK-B0 and CLOCK-B1 latched by the rising edge of the clock CLOCK-A are both high "H", that is, if the phase of the locked clock CLOCK-B5 is shifted significantly in the phase advance direction (drifting outside the range P2 shown in FIG. 20), then the clock CLOCK-B7 whose phase is delayed with respect to the phase of the clock CLOCK-B5 is selected as the next candidate. If, in step ST25, it is determined that the levels of the clocks CLOCK-B0 and CLOCK-B1 latched by the rising edge of the clock CLOCK-A are not both high "H", the process returns to ST22.

On the other hand, if it is determined in step ST23 that the levels of the clocks CLOCK-B0 and CLOCK-B1 latched by the rising edge of the clock CLOCK-A are not high "H" and low "L", respectively, the process proceeds to step ST27 where the levels of the clocks CLOCK-B0 and CLOCK-B1 are again latched by the rising edge of the clock CLOCK-A, as in step ST22, after which the process proceeds to step ST28. If it is determined in step ST28 that the levels of the clocks CLOCK-B0 and CLOCK-B1 latched by the rising edge of the clock CLOCK-A are both high "H", that is, if the phase of the locked clock CLOCK-B5 is shifted significantly in the phase delay direction (drifting outside the range P2 shown in FIG. 20), then the clock CLOCK-B3 whose phase is advanced with respect to the phase of the clock CLOCK-B5 is selected as the next candidate. If, in step ST28, it is determined that the levels of the clocks CLOCK-B0 and CLOCK-B1 latched by the rising edge of the clock CLOCK-A are not both high "H", the process returns to ST22.

In this way, the range (defining a comparison condition for unlocking) outside which the locked state of the clock acquired by detecting the test clocks is unlocked is relaxed compared with the comparison condition for holding (maintaining) the locked clock; this prevents the locked clock from being unlocked due to the jitter of its own, and thus serves to stabilize the clock selection (locking or unlocking) operation.

In the above example, it will be appreciated that the clocks used in the second circuit for data latching and selection (locking) are not limited to eight-phase clocks, and that the combination of the candidate clock and the test clocks to be detected can be changed in various ways.

Figure 22:
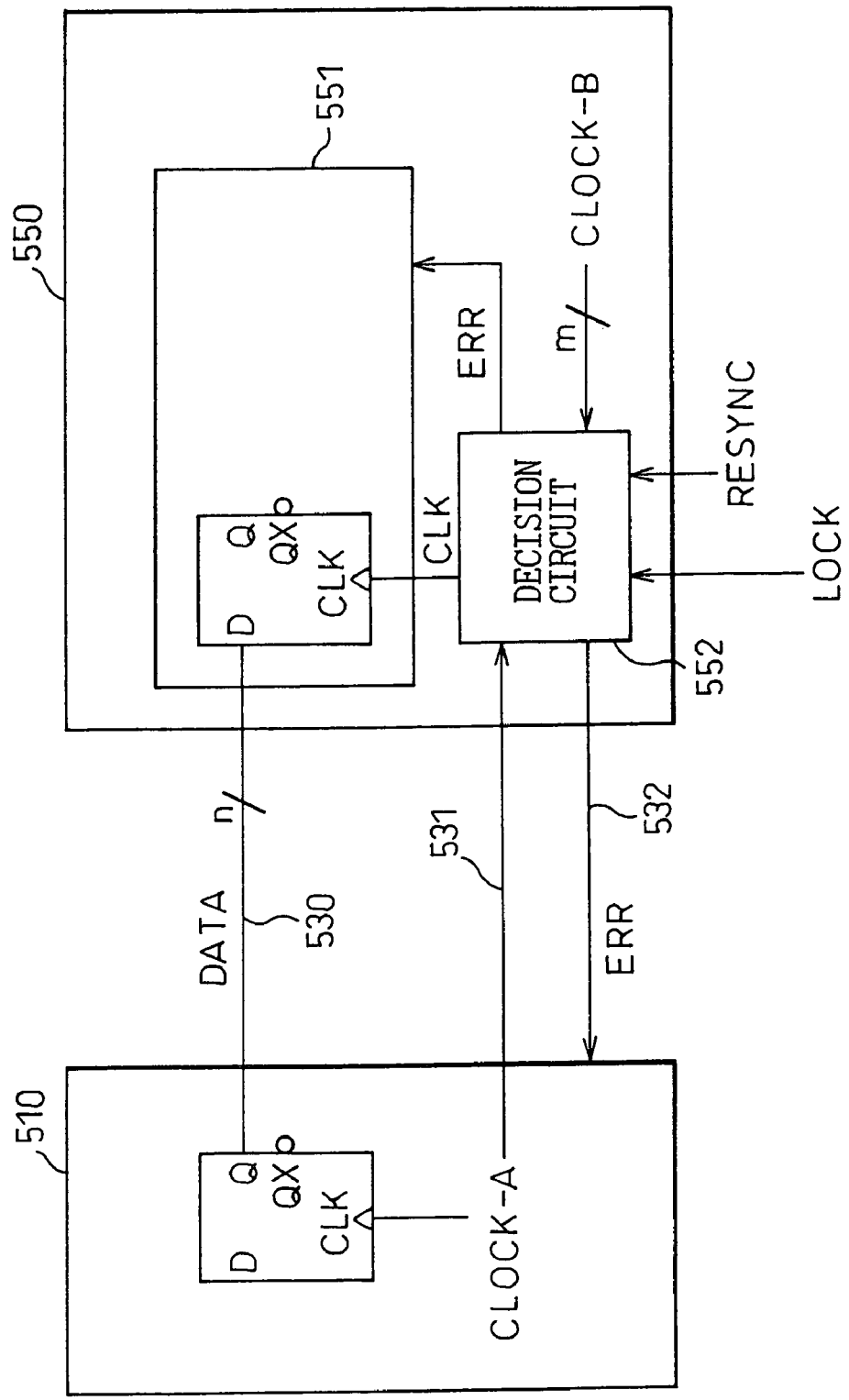
FIG. 22 is a block diagram schematically showing a second embodiment of a timing signal generating circuit according to the present invention.

FIG. 22 is a block diagram schematically showing a second embodiment of a timing signal generating circuit (signal transmission system) according to the present invention. In FIG. 22, reference numeral 510 is a first circuit (block A: transmitting circuit), 550 is a second circuit (block B), 530 is an n-bit wide data transmission line over which data are transferred between the first circuit 510 and the second circuit 550, 531 is a clock transmission line over which a clock (CLOCK-A) is transmitted from the first circuit 510 to the second circuit 550, 532 is an error signal transmission line over which an error signal ERR is transmitted from the second circuit 550 to the first circuit 510, 551 is a receiving circuit, and 552 is a decision circuit.

As shown in FIG. 22, in the timing signal generating circuit of the second embodiment, the decision circuit 552 is supplied with m different phase clocks CLOCK-B (for example, four-phase clocks), a synchronization reset signal RESYNC, and a lock signal LOCK, and is also supplied, via the clock transmission line 531, with the clock CLOCK-A used in the first circuit 510. The decision circuit is configured to output an error signal ERR to the receiving circuit 551 as well as to the transmitting circuit 510.

More specifically, the decision circuit 552 selects an optimum clock from among the m different phase clocks CLOCK-B supplied to it, and outputs the selected clock as the receive clock (CLK) to the receiving circuit 551; if it is determined that the locked clock should be unlocked, the decision circuit 552 outputs the error signal ERR indicating the unlocking of the clock to the transmitting circuit 10, the transmitter of data, as well as to the receiving circuit 551 which is receiving (regenerating) the data. The operation of the decision circuit 552 is the same as that described with reference to FIGS. 18 to 21 or FIGS. 8 to 10.

The synchronization reset signal RESYNC and the lock signal LOCK are supplied from an external circuit directly to the decision circuit 552 so that the operation of the decision circuit 552 can be forcefully re-executed by the synchronization reset signal RESYNC, and so that the operation of the decision circuit can be disabled (forcefully locked) by the lock signal LOCK.

Figure 23:
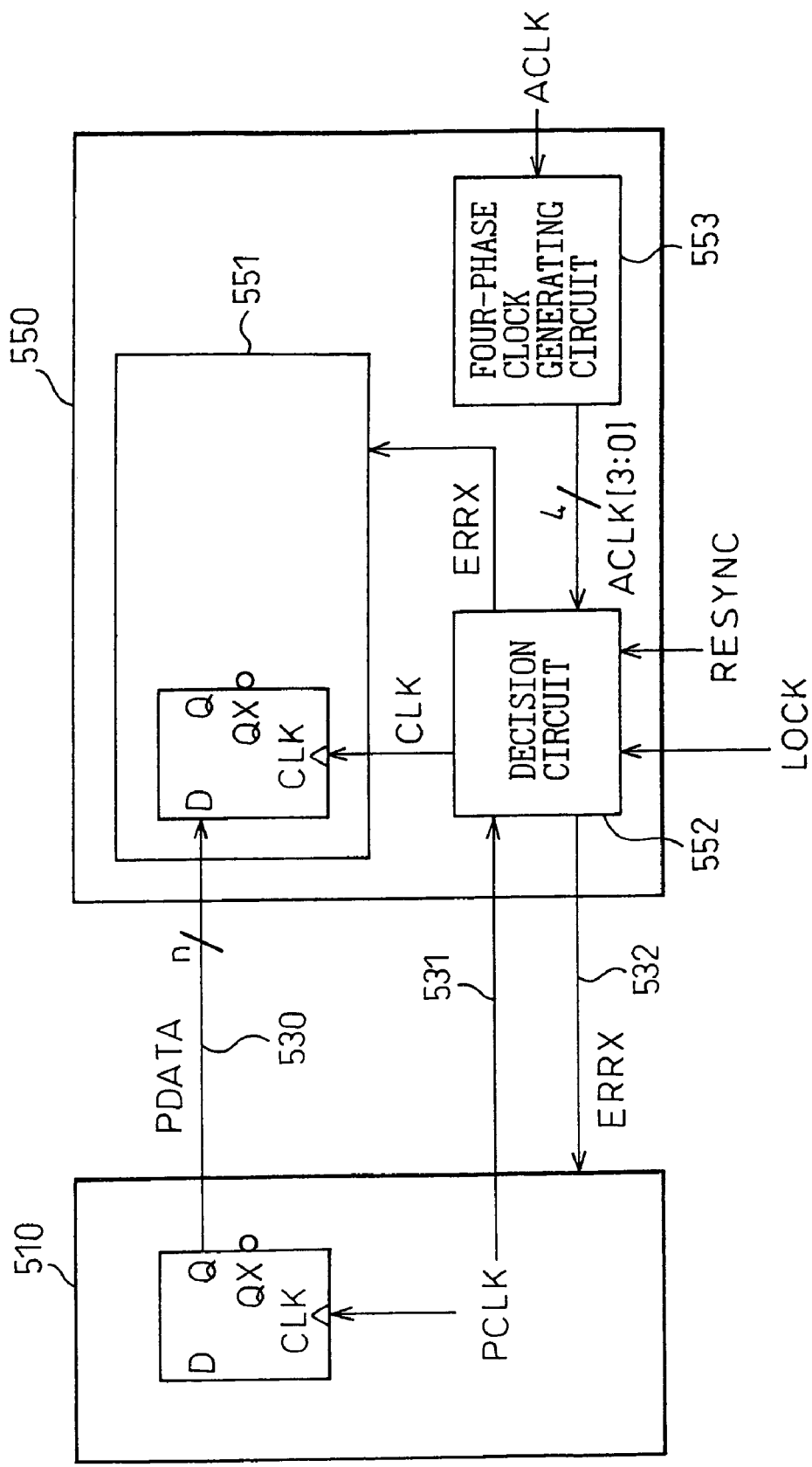
FIG. 23 is a block diagram schematically showing a third embodiment of a timing signal generating circuit according to the present invention.

FIG. 23 is a block diagram schematically showing a third embodiment of a timing signal generating circuit (signal transmission system) according to the present invention.

As is apparent from a comparison between FIG. 23 and FIG. 22, the timing signal generating circuit of the third embodiment includes a four-phase clock generating circuit 553 for generating four-phase clocks, ACLK[0], ACLK[1], ACLK[2]), and ACLK[3], from a clock ACLK, and the outputs (four-phase clocks ACLK[0] to ACLK[3]) of the four-phase clock generating circuit 553 are supplied to the decision circuit 552. In FIG. 23, clock PCLK and data PDATA correspond to the clock CLOCK-A and data DATA in FIG. 22.

The first circuit (transmitting circuit) 510 outputs the data PDATA synchronized to the clock PCLK, and supplies it to the receiving circuit 551 via the data transmission line 530. In the second circuit 550, the four-phase clock generating circuit 553 generates the four-phase clocks ACLK[0] to ACLK[3] to be used to receive data, from the clock ACLK whose frequency is twice that of the clock PCLK, and the decision circuit 552 makes decisions on the levels of the test clocks by using the clock PCLK supplied from the transmitting circuit 510, and supplies the corresponding candidate clock as the receive clock (CLK) to the receiving circuit 551. The operation of the decision circuit 552 is the same as that described with reference to FIGS. 18 to 21 or FIGS. 8 to 10.

In this embodiment also, when the clock cannot be determined, the decision circuit 552 outputs an error signal ERRX to the transmitting circuit 510 as well as to the receiving circuit 551 (the data receiving block in the second circuit 550). The decision circuit 552 is also supplied externally with a lock signal LOCK for forcefully locking the clock and a synchronization reset signal RESYNC for forcefully re-executing the selection operation. Here, the error signal ERRX is a low enable signal, an inverted logic signal of the error signal ERR.

Figure 24:
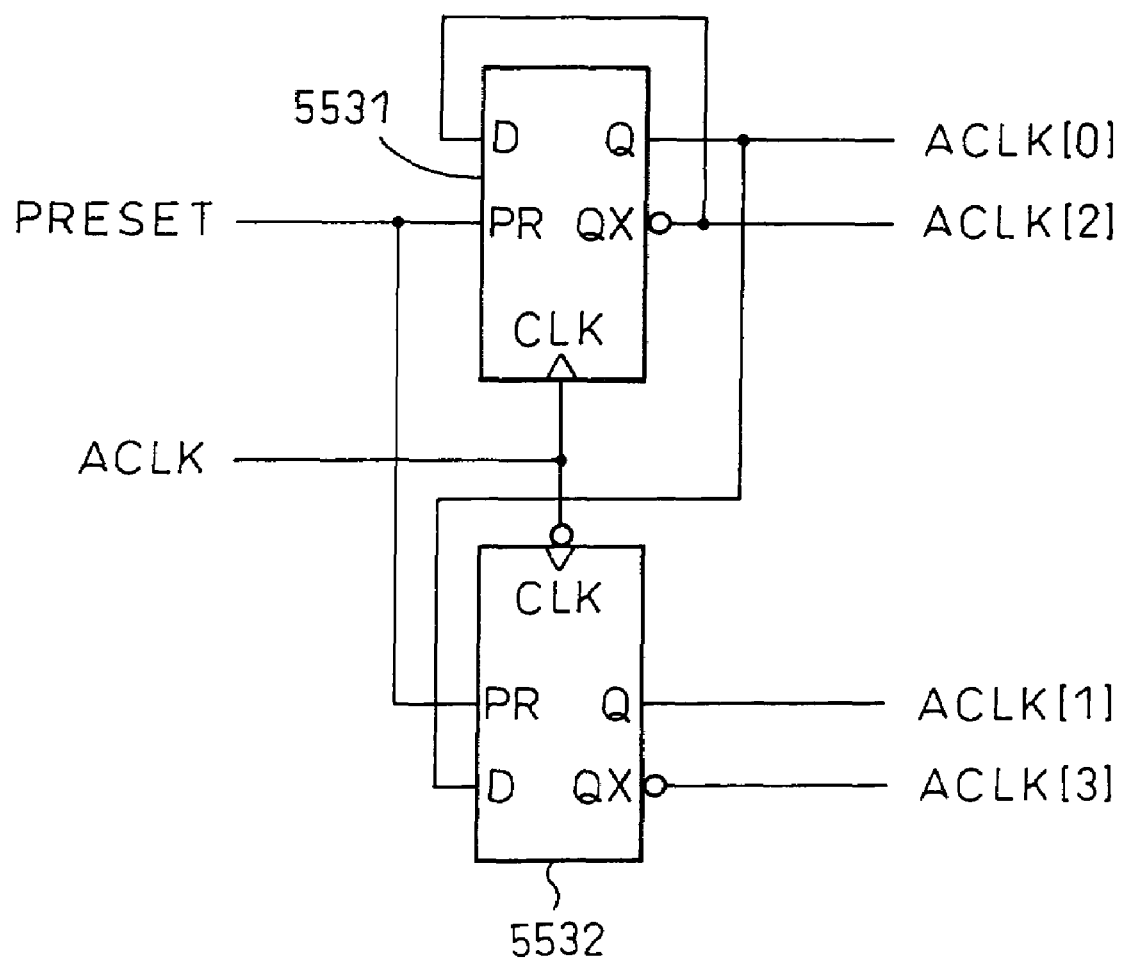
FIG. 24 is a circuit diagram showing one example of a four-phase clock generating circuit in the timing signal generating circuit of FIG. 23.
Figure 25:
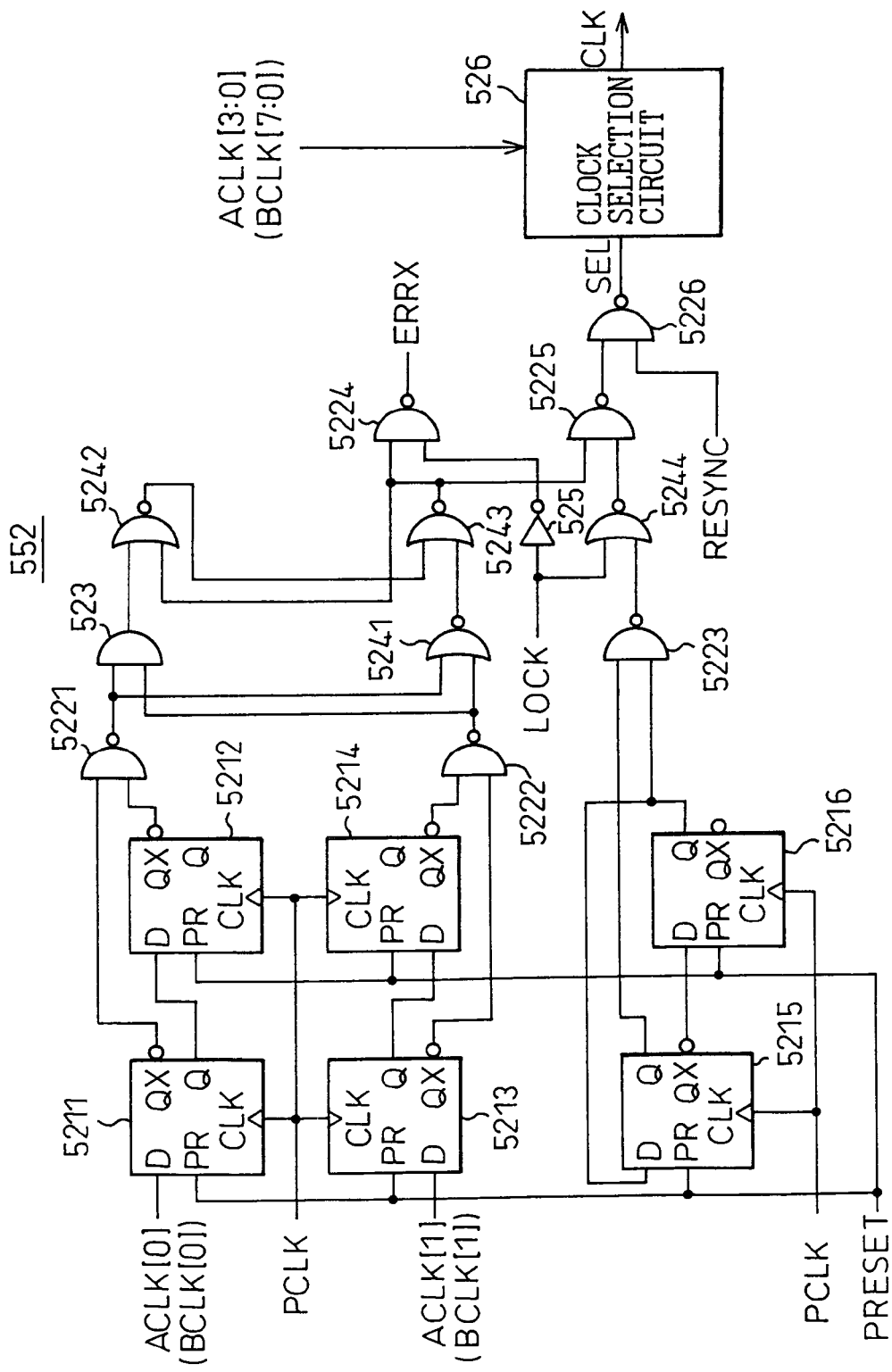
FIG. 25 is a circuit diagram showing one example of a decision circuit in the timing signal generating circuit of FIG. 23.
Figure 26:
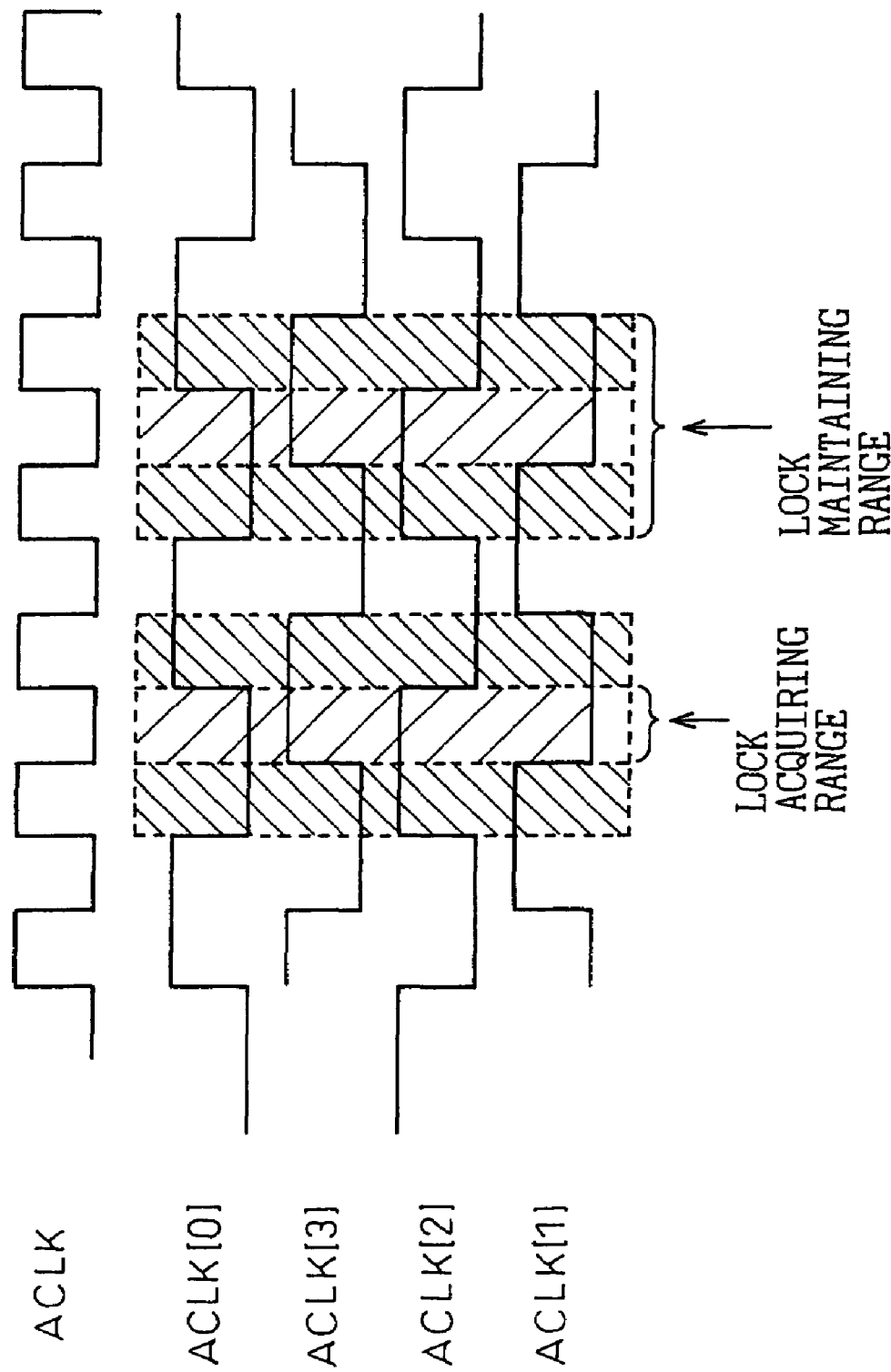
FIG. 26 is a diagram for explaining the operation of the timing signal generating circuit of FIG. 23.

FIG. 24 is a circuit diagram showing one example of the four-phase clock generating circuit in the timing signal generating circuit of FIG. 23, FIG. 25 is a circuit diagram showing one example of the decision circuit in the timing signal generating circuit of FIG. 23, and FIG. 26 is a diagram for explaining the operation of the timing signal generating circuit of FIG. 23.

The four-phase clock generating circuit 553 comprises two flip-flops 5531 and 5532, as shown in FIG. 24, and generates the four-phase clocks ACLK[0] to ACLK[3] from the clock ACLK whose frequency is twice that of the clock PCLK, as shown in FIG. 26. The flip-flops 5531 and 5532 are each supplied with a preset signal PRESET. The four-phase clocks ACLK[0] to ACLK [3] generated by the four-phase clock generating circuit 553 are supplied to the decision circuit 552, which selects a prescribed candidate clock that matches the results of the decisions made on the test clocks and supplies it as the clock CLK to the receiving circuit 551.

The decision circuit 552 comprises a plurality of flip-flops 5211 to 5216, a plurality of NAND dates 5221 to 5226, an AND gate 523, a plurality of NOR gates 5241 to 5244, an inverter 52, and a clock selecting circuit 526. It will be recognized that the four-phase clock generating circuit 553 and the decision circuits 552 shown in FIGS. 24 and 25, respectively, are merely configuration examples and can be configured in various other ways.

In the example of FIG. 25, two test clocks (for example, clocks ACLK[0] and ACLK[1]) are set for one candidate clock, and these test clocks are latched by the clock PCLK to make decisions on their levels; then, the candidate clock (for example, ACLK[3]) associated with the test clocks is selected from among the four-phase clocks ACLK[0] to ACLK[3], and is output as the clock CLK to be used in the receiving circuit 551.

As shown in FIG. 25, by detecting the test clocks ACLK[0] and ACLK[1] in the respective flip-flops 5211 and 5213, and detecting the outputs of the flip-flops 5211 and 5213 in the respective flip-flops 5212 and 5214, that is, by detecting the two test clocks ACLK[0] and ACLK[1] by the rising edge of the clock PCLK two times in succession, the decision circuit 552 outputs a select signal SEL and thereby controls the locking and unlocking of the clock CLK supplied to the receiving circuit 551. The decision circuit 552 of FIG. 25 is configured so that the error signal ERRX is produced as the output of the NAND gate 5224, and so that the resetting and locking (forceful locking) of the circuit can be done by externally applying the synchronization reset signal RESYNC and the lock signal LOCK, respectively.

Here, as shown in FIG. 23, the error signal ERRX is supplied to the transmitting circuit 510 and the receiving circuit 551, which then perform prescribed processing; for example, the transmitting circuit 510 stops outputting the data or re-transmits the data, while the receiving circuit 551 stops receiving the data or discards or re-latches the received data. As shown in FIG. 26, in the third embodiment, the decision to lock the clock based on the decisions made on the two test clocks is done, for example, over a range of 90°, while the decision to unlock the locked clock is done, for example, over a range of 270°.

Figure 27:
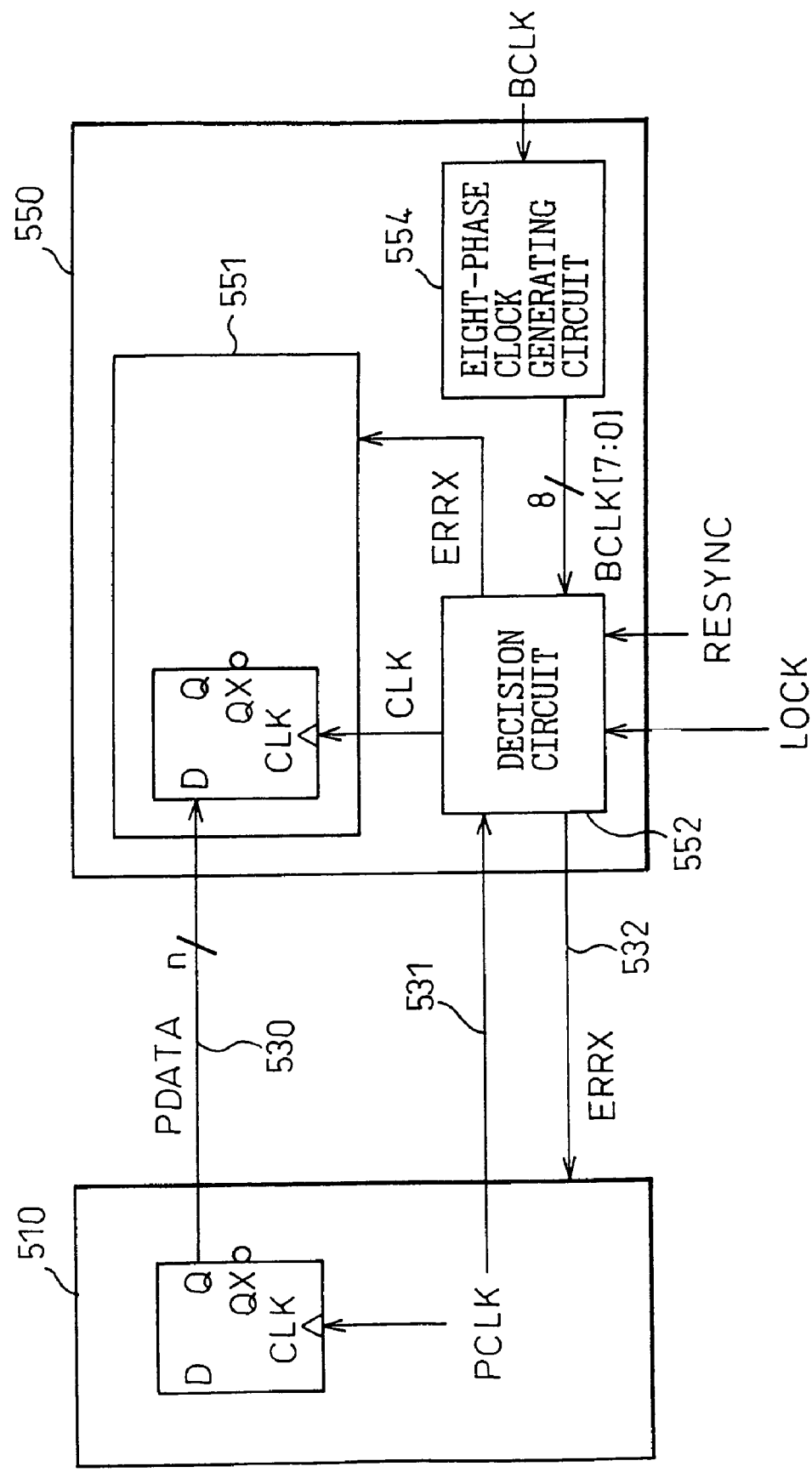
FIG. 27 is a block diagram schematically showing a fourth embodiment of a timing signal generating circuit according to the present invention.
Figure 28:
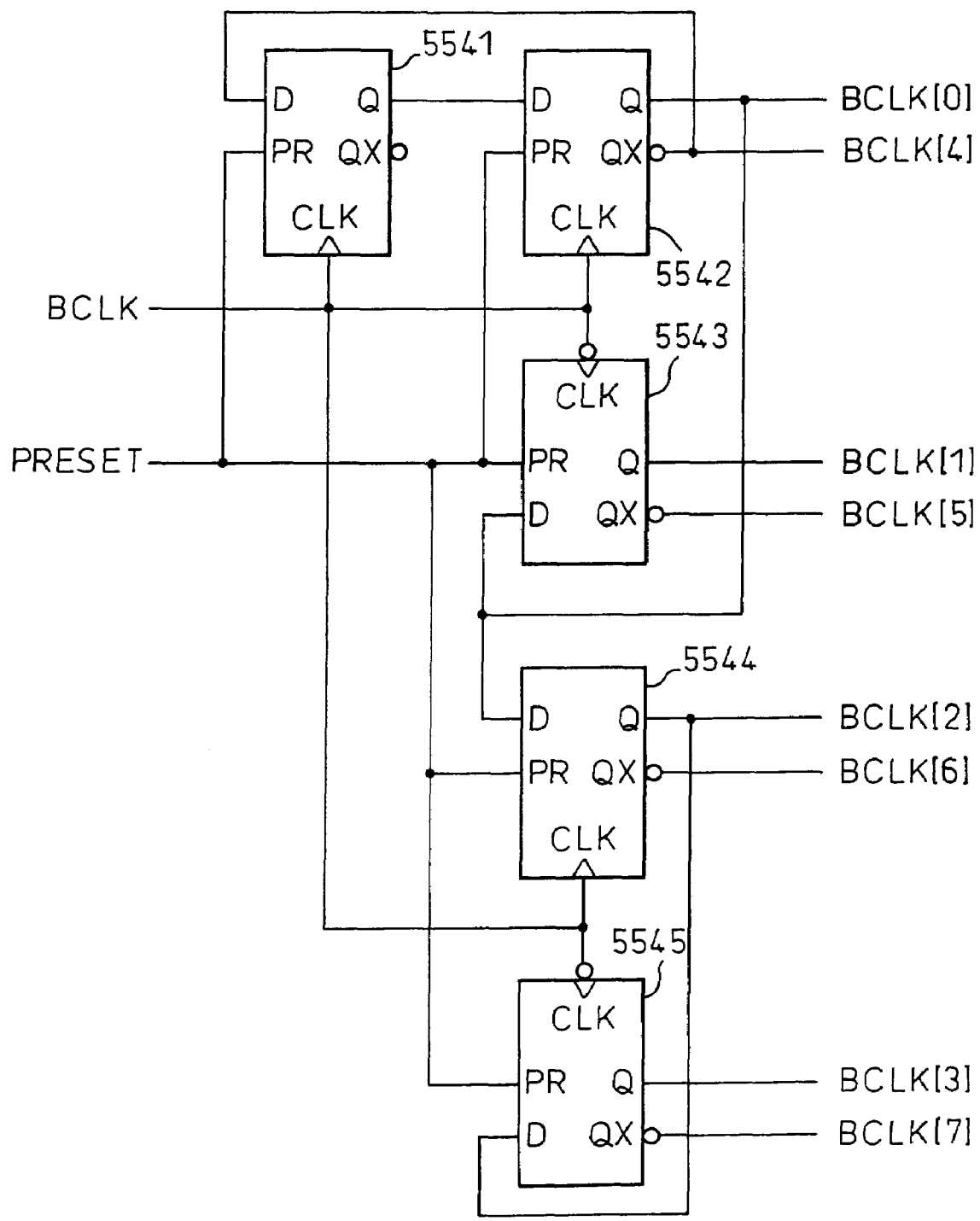
FIG. 28 is a circuit diagram showing one example of an eighth-phase clock generating circuit in the timing signal generating circuit of FIG. 27.
Figure 29:
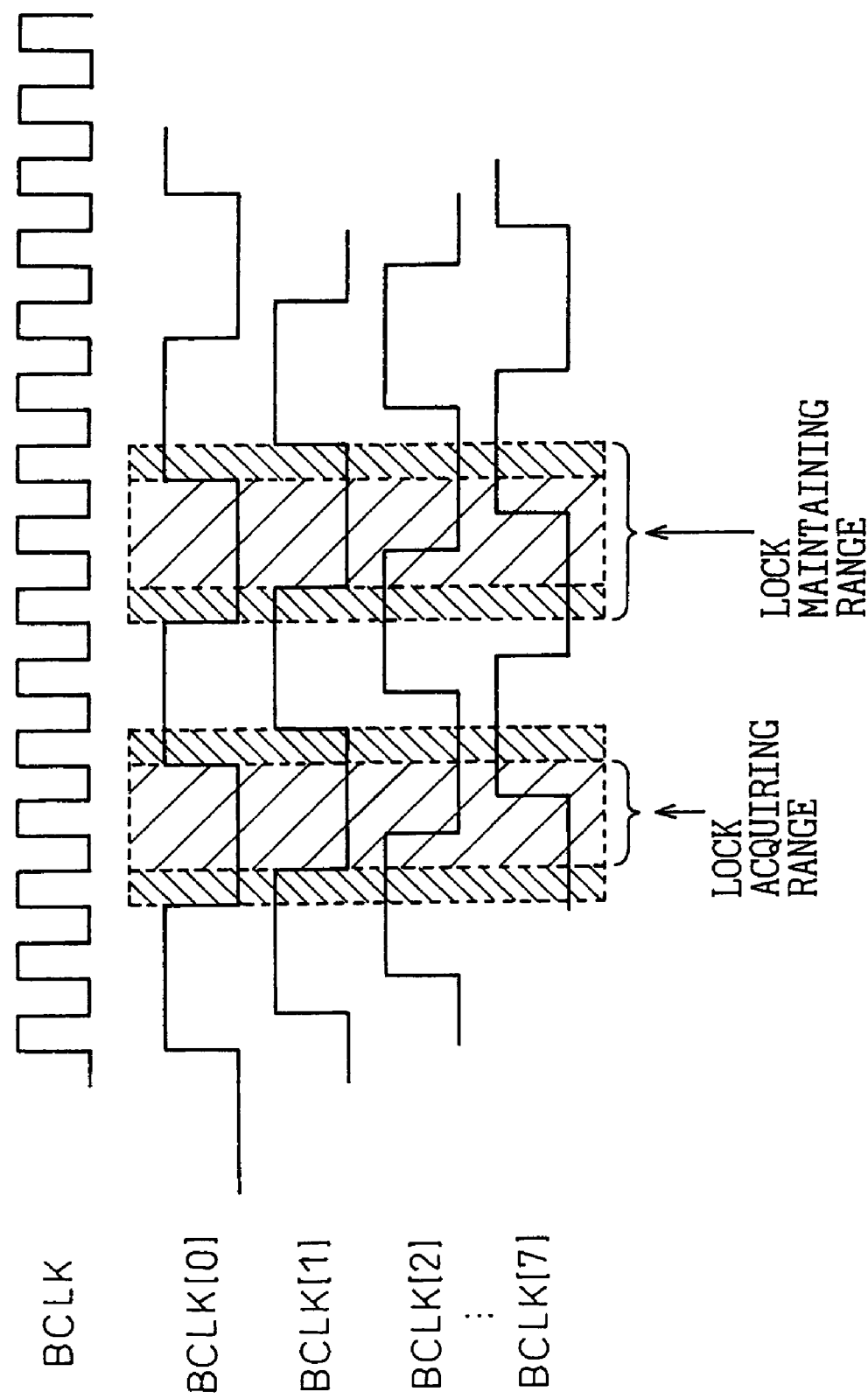
FIG. 29 is a diagram for explaining the operation of the timing signal generating circuit of FIG. 27.

FIG. 27 is a block diagram schematically showing a fourth embodiment of a timing signal generating circuit according to the present invention, FIG. 28 is a circuit diagram showing one example of an eighth-phase clock generating circuit in the timing signal generating circuit of FIG. 27, and FIG. 29 is a diagram for explaining the operation of the timing signal generating circuit of FIG. 27.

As is apparent from a comparison between FIG. 27 and FIG. 23, the timing signal generating circuit of the fourth embodiment includes an eight-phase clock generating circuit 554 for generating eight-phase clocks BCLK[0] to BCLK[7] with phases spaced 45° apart, in place of the four-phase clock generating circuit 553 provided in the timing signal generating circuit of the foregoing third embodiment.

The eight-phase clock generating circuit 554 comprises five flip-flops 5541 to 5545, as shown in FIG. 28, and generates the eight-phase clocks BCLK[0] to BCLK[7] from the clock BCLK whose frequency is four times that of the clock PCLK, as shown in FIG. 29. The flip-flops 5541 to 5545 are each supplied with a preset signal PRESET. The eight-phase clocks BCLK[0] to BCLK[7] generated by the eight-phase clock generating circuit 554 are supplied to the decision circuit 552, which selects a prescribed candidate clock that matches the results of the decisions made on the test clocks and supplies it as the clock CLK to the receiving circuit 551.

The decision circuit 552 is the same as that shown in FIG. 25; in this embodiment, however, the clocks supplied to the clock selecting circuit 526 are the eight-phase clocks BCLK[0] to BCLK[7], not the four-phase clocks ACLK[0] to ACLK[3], and the test clocks are the two clocks BCLK[0] and BCLK[1] selected from among the eight-phase clocks BCLK[0] to BCLK[7], not the two clocks ACLK[0] and ACLK[1] selected from among the four-phase clocks ACLK[0] to ACLK[3].

More specifically, by detecting the test clocks BCLK[0] and BCLK[1] in the respective flip-flops 5211 and 5213, and detecting the outputs of the flip-flops 5211 and 5213 in the respective flip-flops 5212 and 5214, as shown in FIG. 25, that is, by detecting the two test clocks BCLK[0] and BCLK[1] by the rising edge of the clock PCLK two times in succession, the decision circuit 552 outputs a select signal SEL and thereby controls the locking and unlocking of the clock CLK supplied to the receiving circuit 551 (the control such as described with reference to FIGS. 19 and 20). The decision circuit 552 of FIG. 25, as previously described, is configured so that the error signal ERRX is produced as the output of the NAND gate 5224, and so that the resetting and locking (forceful locking) can be done by externally applying the synchronization reset signal RESYNC and the lock signal LOCK, respectively.

As shown in FIG. 29, in the fourth embodiment, the decision to lock the clock based on the two test clocks is done, for example, over a range of 135°, while the decision to unlock the locked clock is done, for example, over a range of 225°.

Figure 30:
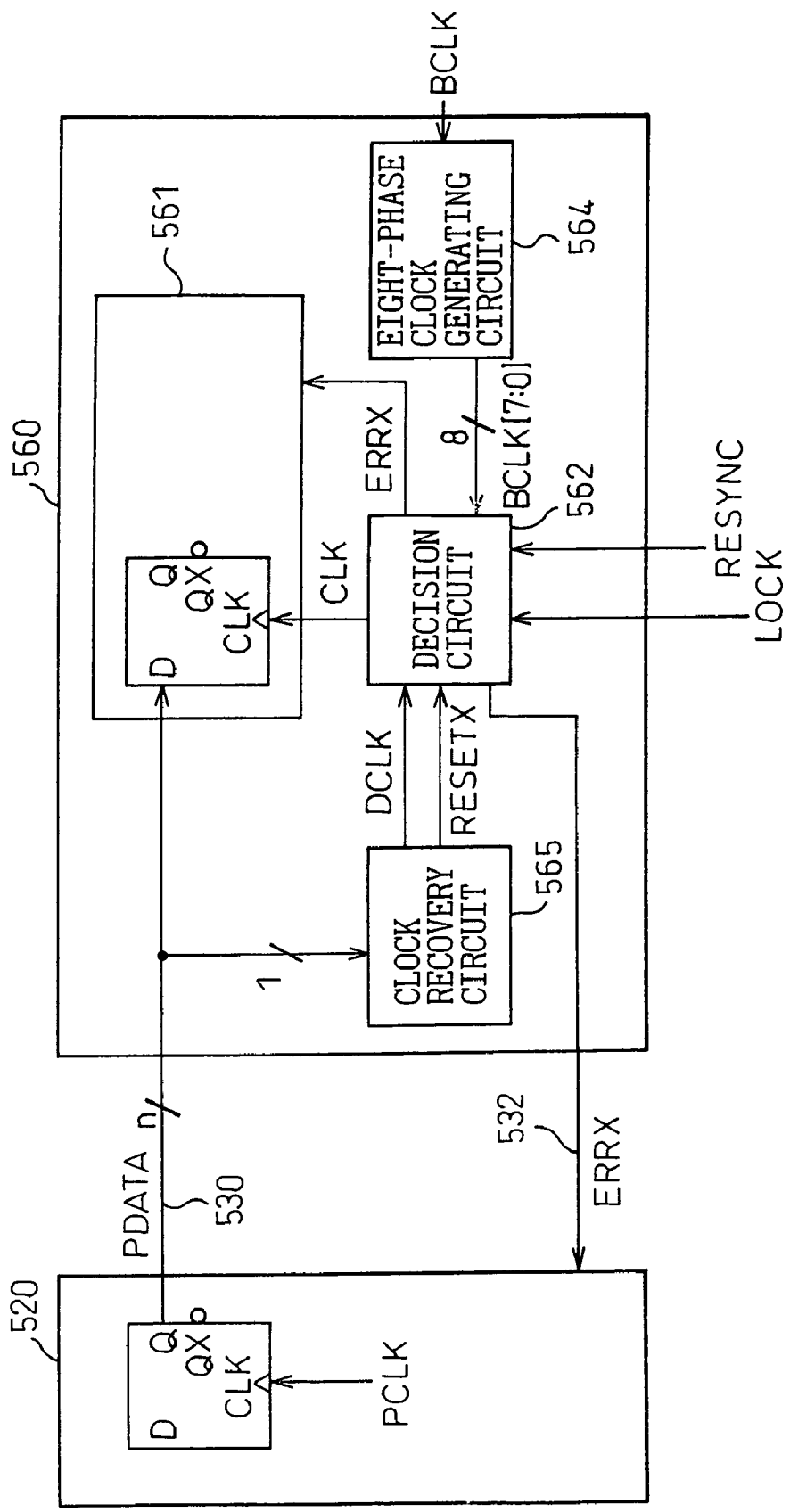
FIG. 30 is a block diagram schematically showing a fifth embodiment of a timing signal generating circuit according to the present invention.

FIG. 30 is a block diagram schematically showing a fifth embodiment of a timing signal generating circuit according to the present invention. In FIG. 30, reference numeral 520 is a first circuit, 560 is a second circuit, 530 is an n-bit wide data transmission line over which data (including a clock) are transferred between the first circuit 520 and the second circuit 560, and 532 is an error signal transmission line over which an error signal ERRX is transmitted from the second circuit 560 to the first circuit 520. Further, reference numeral 561 is a receiving circuit, 562 is a decision circuit, 564 is an eight-phase clock generating circuit, and 565 is a clock recovery circuit.

As shown in FIG. 30, in the timing signal generating circuit of the fifth embodiment, the clock transmission line (531) for transmitting the clock from the first circuit to the second circuit is not provided, but the clock is transmitted by being included in the data PDATA. That is, the clock recovery circuit 565, which is provided in the second circuit 560, recovers the clock DCLK (corresponding to the clock PCLK transmitted from the first circuit 510 to the second circuit 550 (decision circuit 552) via the clock transmission line 531 in FIG. 23) from the data PDATA transmitted over the data transmission line 530, and supplies the recovered clock to the decision circuit 562. Techniques for transmitting data with clock information included therein from the first circuit 520 to the second circuit 560 include, for example, 8B/10B (or 10B/8B) with a run length of 5, SONET with a run length of 72, etc. Usually, values within the limits of the above two are used as the actual specification of the data PDATA.

FIGS. 31A, 31B, 31C, and 31D are circuit diagrams showing one example of the clock recovery circuit in the timing signal generating circuit of FIG. 30, and FIG. 32 is a diagram for explaining the operation of the clock recovery circuit in the timing signal generating circuit of FIG. 30.

Figure 31D:
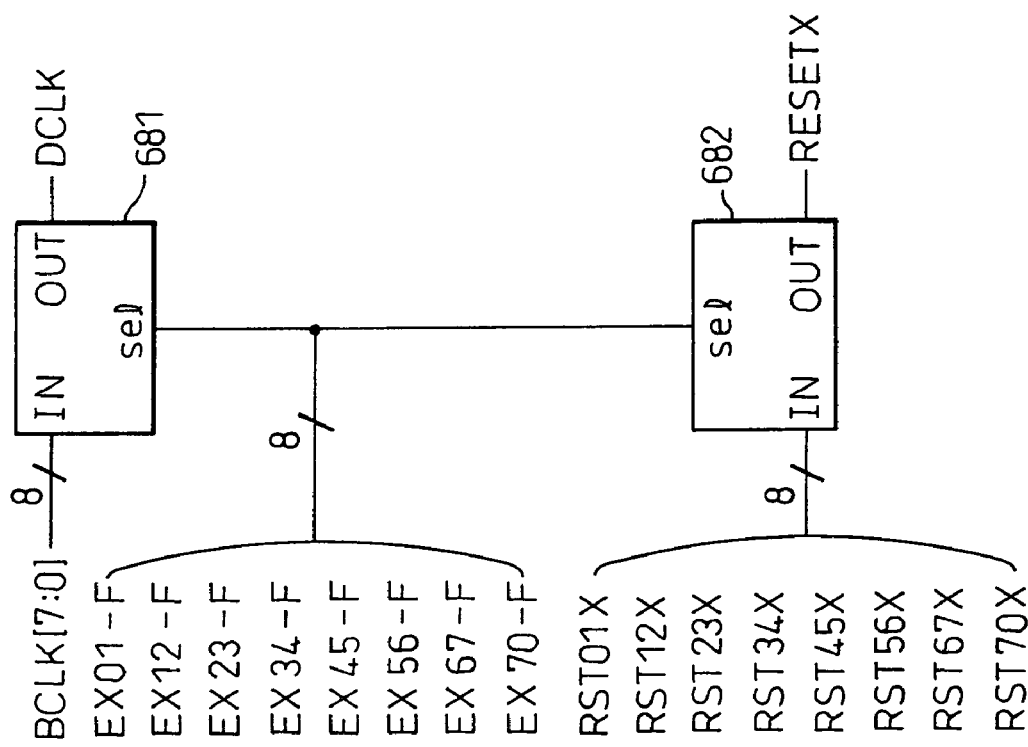

As shown in FIGS. 31A to 31D, the clock recovery circuit 565 comprises a plurality of flip-flops 650 to 657 (FIG. 31A), a plurality of exclusive-NOR (EXNOR) gates 660 to 667 (FIG. 31B), a NOR gate 670, a plurality of NAND gates 671 to 674, inverters 675 and 676 (FIG. 31C), and selection circuits 681 and 682 (FIG. 31D).

As shown in FIG. 31A, the data PDATA and a designated one of the eight-phase clocks BCLK[0] to BCLK[7] are supplied to each of the flip-flops 650 to 657, and the data PDATA is latched by the respective eight-phase clocks BCLK[0] to BCLK[7]. Actually, after inputting the data to the flip-flops a plurality of times, outputs (BD[0] to BD[7]) are obtained. Therefore, the data latched into one of the eight flip-flops 650 to 657 invariably contains a boundary across which the data changes from high "H" to low "L" or vice versa.

As shown in FIG. 31B, the EXNOR gates 660 to 667 are provided to detect this boundary, and are each supplied with the outputs (BD[0], BD[1]; BD[1], BD[2]; . . . ; BD[7], BD[0]) of adjacent two of the flip-flops 650 to 657 and detect the position where the output of either flip flop changes from high "H" to low "L" or vice versa (one of the outputs EX01X to EX70X of the EXNOR gates 660 to 667 goes high "H").

Figure 31C:
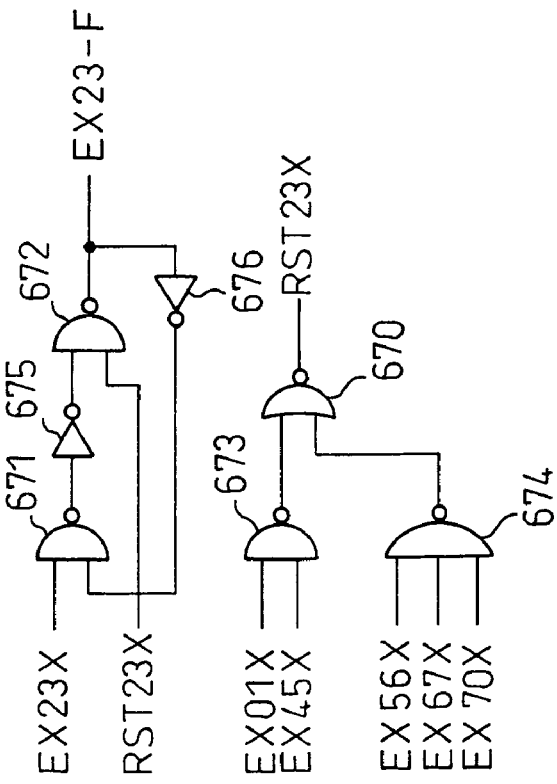

After generating the outputs EX[n, n+1]X for all the clocks (clocks BCLK[0] to BCLK[7]) in this way, each output is supplied to a latch such as shown in FIG. 31C (the latch consists of the NAND gates 671 and 672 and inverters 675 and 676) to hold the state as a flag, and a reset signal RST23X is generated by a logic circuit consisting of the NOR gate 670 and NAND gates 673 and 674. FIG. 31C shows the block assuming the case where, of the eight-phase clocks, there is a boundary between BCLK[2] and BCLK[3]; actually, there are eight such blocks by which flags EX01-F to EX70F are held and reset signals RST01X to RST70X are generated. The specification here provides that one of the flags EX01-F to EX70F be high "H" and all the others be low "L".

Further, as shown in FIG. 31D, the flags EX01-F to EX70F held by the latches are each supplied as a select signal to the selection control terminals of the selection circuits 681 and 682. The selection circuit 681 selects one of the eight-phase clocks BCLK[0] to BCLK[7] input in accordance with the select signal input, and outputs the selected clock as the clock DCLK. On the other hand, the selection circuit 682 selects one of the reset signals RST01X to RST70X input in accordance with the select signal input, and outputs the selected signal as the reset signal RESETX.

More specifically, as shown in FIG. 32, when the selection logic is such that only the flag EX23 is high "H", for example, the clock BCLK[0] is selected as the output signal (DCLK), and the reset signal RST23X as the reset signal (RESETX). The clock DCLK and the reset signal RESETX are supplied to the decision circuit 562.

Figure 33:
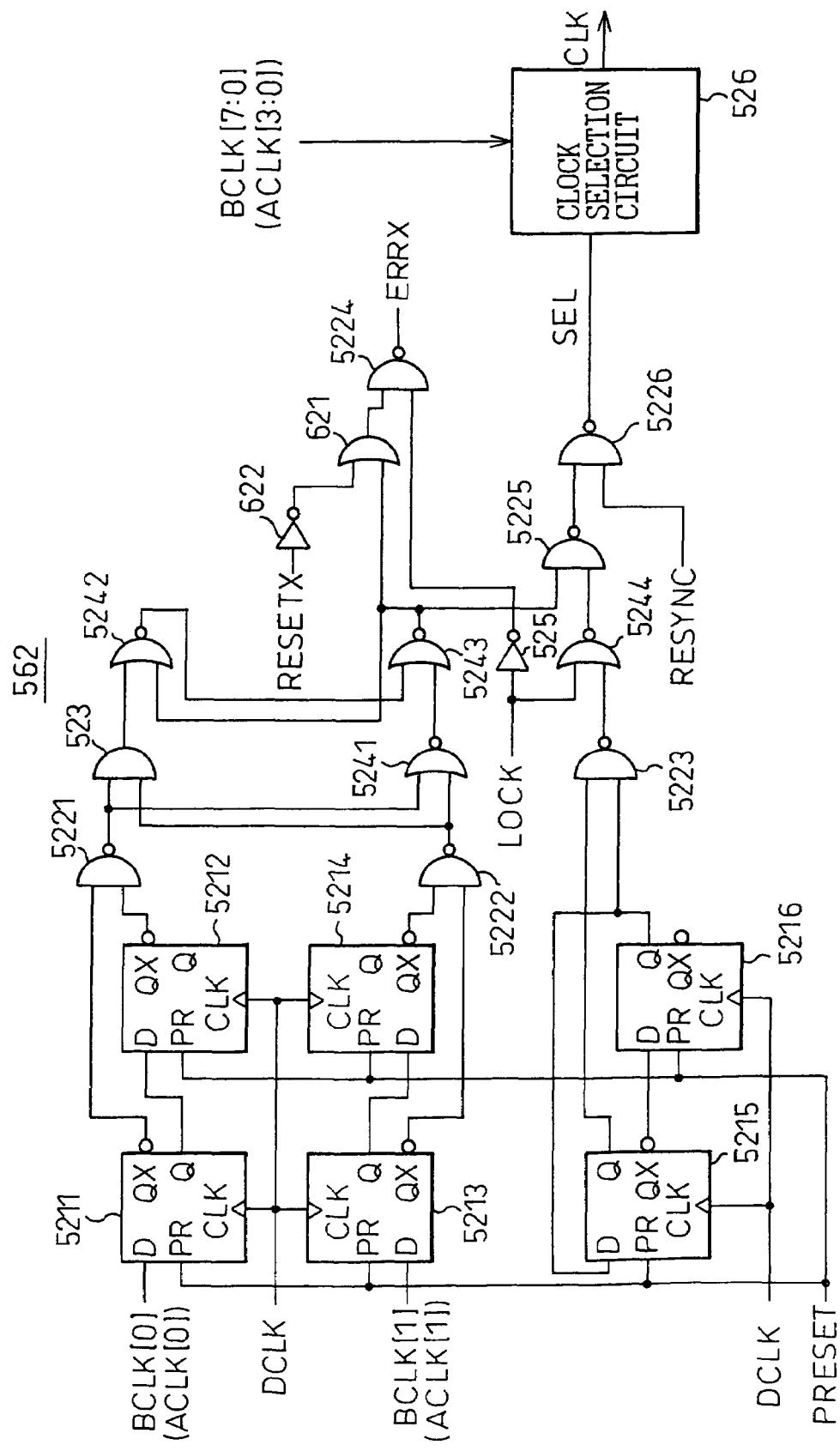
FIG. 33 is a circuit diagram showing one example of a decision circuit in the timing signal generating circuit of FIG. 30.

FIG. 33 is a circuit diagram showing one example of the decision circuit in the timing signal generating circuit of FIG. 30.

As is apparent from a comparison between FIG. 33 and FIG. 25, the decision circuit 562 of the fifth embodiment differs from the decision circuit 552 of FIG. 25 in that a NOR gate 621 and an inverter 622 are added and the reset signal RESETX is supplied as an input to the inverter 622, and in that the clock DCLK obtained from the clock recovery circuit 565 is used in place of the clock PCLK used in the decision circuit 552 of FIG. 25.

FIG. 34 is a diagram for explaining the operation of the decision circuit in the timing signal generating circuit of FIG. 30.

In operation, as shown in FIG. 34, the two test clocks BCLK[0] and BCLK[1] are detected by the rising edge of the clock DCLK two times in succession, and if all the detected levels are low "L", the clock BCLK[5], for example, is selected (locked) and defined as the clock (receive clock) to be supplied to the receiving circuit 561. Depending on the frequency of the clock used, the clock BCLK[4] or the clock BCLK[3], not the clock BCLK[5], may be defined as the receive clock CLK to be supplied to the receiving circuit 561, as already described. On the other hand, when using the four-phase clocks ACKL[0] to ACLK[3] instead of the eight-phase clocks BCLK[0] to BCLK[7], two test clocks, for example, ACLK[0] and ACLK[1], are detected by the rising edge of the clock DCLK two times in succession, and if all the detected levels are low "L", the clock ACLK[3], for example, is selected as the receive clock CLK.

In any of the above-described embodiments, the decision circuit (552, 562), the clock generating circuit (553, 554), the clock recovery circuit (565), etc. can be configured in various other ways, and the output of the clock generating circuit is not limited to four-phase clocks or eight-phase clocks.

As described above, according to each embodiment of the present invention, even when the clock phase difference is not guaranteed between the transmitting and receiving circuits operating at the same frequency, or when the jitter of the clock is not guaranteed, stable transmission and reception of data can be achieved. It is also possible to enhance the accuracy with which to determine the cause when a data error occurs.

As described in detail above, according to the present invention, high-speed, error-free signal transmission can be achieved by generating a clock that can ensure reliable signal reception by accounting for the phase difference.

Many different embodiments of the present invention may be constructed without departing from the spirit and scope of the present invention, and it should be understood that the present invention is not limited to the specific embodiments described in this specification, except as defined in the appended claims.

What is claimed is:

1. A timing signal generating circuit comprising:
   a candidate timing signal generating circuit generating a plurality of candidate timing signals with different phases; and
   a receive timing signal control circuit selecting a receive timing signal to be used to receive data, from among said plurality of candidate timing signals in accordance with a prescribed condition, and holding said selected receive timing signal, wherein said receive timing signal control circuit comprises:
   a test timing signal comparing circuit comparing a test timing signal, predetermined for each of said candidate timing signals, with a reference timing signal; and
   a receive timing signal selection/holding circuit selecting and holding said receive timing signal in accordance with an output of said test timing signal comparing circuit.

2. The timing signal generating circuit as claimed in claim 1, wherein a plurality of said test timing signals are set for each of said candidate timing signals, and said test timing signal comparing circuit compares said plurality of test timing signals with said reference timing signal.

3. The timing signal generating circuit as claimed in claim 2, wherein said test timing signal comparing circuit compares said plurality of test timing signals with said reference timing signal a plurality of times, and said receive timing signal selection/holding circuit selects and holds said receive timing signal in accordance with the results of the plurality of comparisons made by said test timing signal comparing circuit.

4. The timing signal generating circuit as claimed in claim 1, wherein said reference timing signal is supplied in parallel with said received data.

5. The timing signal generating circuit as claimed in claim 1, wherein said reference timing signal is supplied by being included in a stream of said received data.

6. The timing signal generating circuit as claimed in claim 1, wherein said receive timing signal control circuit further comprises a receive timing signal releasing circuit releasing said selected and held receive timing signal in accordance with the output of said test timing signal comparing circuit.

7. The timing signal generating circuit as claimed in claim 6, wherein when said receive timing signal is released by said receive timing signal releasing circuit, said receive timing signal selection/holding circuit selects and holds a new receive timing signal in accordance with the output of said test timing signal comparing circuit.

8. The timing signal generating circuit as claimed in claim 6, wherein said receive timing signal control circuit further comprises a receive timing signal release notification circuit notifying a circuit external to said timing signal generating circuit of the releasing of said receive timing signal when said receive timing signal releasing circuit has released said selected and held receive timing signal.

9. The timing signal generating circuit as claimed in claim 6, wherein a comparison condition in said test timing signal comparing circuit causing said receive timing signal releasing circuit to release said selected and held receive timing signal is relaxed compared with a comparison condition in said test timing signal comparing circuit causing said receive timing signal selection/holding circuit to select and hold said receive timing signal.

10. A timing signal generating circuit comprising:
a candidate timing signal generating circuit generating a plurality of candidate timing signals with different phases; and
a receive timing signal control circuit selecting a receive timing signal to be used to receive data, from among said plurality of candidate timing signals in accordance with a prescribed condition, and holding said selected receive timing signal, wherein said receive timing signal control circuit further comprises a receive timing signal control disabling circuit externally disabling the selection of said receive timing signal from among said plurality of candidate timing signals and the holding of said selected receive timing signal.

11. A timing signal generating circuit comprising:
a candidate timing signal generating circuit generating a plurality of candidate timing signals with different phases; and
a receive timing signal control circuit selecting a receive timing signal to be used to receive data, from among said plurality of candidate timing signals in accordance with a prescribed condition, and holding said selected receive timing signal, wherein said receive timing signal control circuit further comprises a receive timing signal control re-executing circuit externally re-executing the selection of said receive timing signal from among said plurality of candidate timing signals and the holding of said selected receive timing signal.

12. A signal transmission system comprising a transmitting circuit transmitting data, a signal transmission line, and a receiving circuit receiving data transmitted from said transmitting circuit over said signal transmission line, wherein said receiving circuit comprises a timing signal generating circuit comprising:
a candidate timing signal generating circuit generating a plurality of candidate timing signals with different phases; and
a receive timing signal control circuit selecting a receive timing signal to be used to receive data, from among said plurality of candidate timing signals in accordance with a prescribed condition, and holding said selected receive timing signal, wherein said receive timing signal control circuit comprises:
a test timing signal comparing circuit comparing a test timing signal, predetermined for each of said candidate timing signals, with a reference timing signal; and
a receive timing signal selection/holding circuit selecting and holding said receive timing signal in accordance with an output of said test timing signal comparing circuit.

13. The signal transmission system as claimed in claim 12, wherein a plurality of said test timing signals are set for each of said candidate timing signals, and said test timing signal comparing circuit compares said plurality of test timing signals with said reference timing signal.

14. The signal transmission system as claimed in claim 13, wherein said test timing signal comparing circuit compares said plurality of test timing signals with said reference timing signal a plurality of times, and said receive timing signal selection/holding circuit selects and holds said receive timing signal in accordance with the results of the plurality of comparisons made by said test timing signal comparing circuit.

15. The signal transmission system as claimed in claim 12, wherein said reference timing signal is supplied in parallel with said received data.

16. The signal transmission system as claimed in claim 12, wherein said reference timing signal is supplied by being included in a stream of said received data.

17. The signal transmission system as claimed in claim 12, wherein said receive timing signal control circuit further comprises a receive timing signal releasing circuit releasing said selected and held receive timing signal in accordance with the output of said test timing signal comparing circuit.

18. The signal transmission system as claimed in claim 17, wherein when said receive timing signal is released by said receive timing signal releasing circuit, said receive timing signal selection/holding circuit selects and holds a new receive timing signal in accordance with the output of said test timing signal comparing circuit.

19. The signal transmission system as claimed in claim 17, wherein said receive timing signal control circuit further comprises a receive timing signal release notification circuit notifying a circuit external to said timing signal generating circuit of the releasing of said receive timing signal when said receive timing signal releasing circuit has released said selected and held receive timing signal.

20. The signal transmission system as claimed in claim 17, wherein a comparison condition in said test timing signal comparing circuit causing said receive timing signal releasing circuit to release said selected and held receive timing signal is relaxed compared with a comparison condition in said test timing signal comparing circuit causing said receive timing signal selection/holding circuit to select and hold said receive timing signal.

21. The signal transmission system as claimed in claim 12, wherein said receive timing signal control circuit further comprises a receive timing signal control disabling circuit externally disabling the selection of said receive timing signal from among said plurality of candidate timing signals and the holding of said selected receive timing signal.

22. The signal transmission system as claimed in claim 12, wherein said receive timing signal control circuit further comprises a receive timing signal control re-executing circuit externally re-executing the selection of said receive timing signal from among said plurality of candidate timing signals and the holding of said selected receive timing signal.

23. A timing signal generating method comprising the steps of:
preparing a plurality of candidate timing signals with different phases; and
selecting a receive timing signal to be used to receive data, from among said plurality of candidate timing signals in accordance with a prescribed condition, and holding said selected receive timing signal, wherein the step of selecting and holding of said receive timing signal comprises the steps of:
comparing a test timing signal, predetermined for each of said candidate timing signals, with a reference timing signal; and
selecting and holding said receive timing signal in accordance with the result of the comparison between said test timing signal for said each candidate timing signal and said reference timing signal.

24. The timing signal generating method as claimed in claim 23, wherein a plurality of said test timing signals are set for each of said candidate timing signals, and said plurality of test timing signals are compared with said reference timing signal.

25. The timing signal generating method as claimed in claim 24, wherein said plurality of test timing signals are compared with said reference timing signal a plurality of times, and said receive timing signal are selected and held in accordance with the results of the plurality of comparisons made between said plurality of test timing signals and said reference timing signal.

26. The timing signal generating method as claimed in claim 23, wherein said reference timing signal is supplied in parallel with said received data.

27. The timing signal generating method as claimed in claim 23, wherein said reference timing signal is supplied by being included in a stream of said received data.

28. The timing signal generating method as claimed in claim 23, wherein the selection and holding of said receive timing signal further includes releasing said selected and held receive timing signal in accordance with the result of the comparison between said test timing signal for said each candidate timing signal and said reference timing signal.

29. The timing signal generating method as claimed in claim 28, wherein when said receive timing signal is released, said test timing signal predetermined for each of said candidate timing signals is compared with said reference timing signal to select and hold a new receive timing signal.

30. The timing signal generating method as claimed in claim 28, wherein when said selected and held receive timing signal is released, the releasing of said receive timing signal is notified to an external circuit.

31. The timing signal generating method as claimed in claim 28, wherein a comparison condition for releasing said selected and held receive timing signal is relaxed compared with a comparison condition for selecting and holding said receive timing signal.

32. The timing signal generating method as claimed in claim 23, wherein the selection of said receive timing signal from among said plurality of candidate timing signals and the holding of said selected receive timing signal are disabled from outside.

33. The timing signal generating method as claimed in claim 23, the selection of said receive timing signal from among said plurality of candidate timing signals and the holding of said selected receive timing signal are re-executed from outside.

* * * * *